United States Patent [19]

Shirakawa

[11] Patent Number: 5,956,738
[45] Date of Patent: Sep. 21, 1999

[54] ARTICLE LAYOUT DEVICE FOR AUTOMATIC COLUMN TEXT LAYOUT

[75] Inventor: Takahisa Shirakawa, Tokyo, Japan

[73] Assignee: NEC Corporation, Tokyo, Japan

[21] Appl. No.: 08/810,450

[22] Filed: Mar. 4, 1997

[30] Foreign Application Priority Data

Mar. 4, 1996 [JP] Japan ..................................... 8-045990

[51] Int. Cl.$^6$ .................................................. G06F 17/30
[52] U.S. Cl. ......................................................... 707/517
[58] Field of Search .................................... 707/517, 518, 707/519, 529, 500, 531, 521, 530, 509, 520

[56] References Cited

U.S. PATENT DOCUMENTS

| | | | |
|---|---|---|---|
| 5,323,312 | 6/1994 | Saito et al. | 364/419.1 |
| 5,363,480 | 11/1994 | Usamui et al. | 395/145 |
| 5,438,512 | 8/1995 | Mantha et al. | 364/419 |
| 5,649,216 | 7/1997 | Sieber | 395/767 |

FOREIGN PATENT DOCUMENTS

| | | |
|---|---|---|
| 3-176148 | 7/1991 | Japan . |
| 4-70956 | 3/1992 | Japan . |
| 4-263357 | 9/1992 | Japan . |
| 5-61871 | 3/1993 | Japan . |

*Primary Examiner*—Joseph H. Feild
*Assistant Examiner*—Alford W. Kindred
*Attorney, Agent, or Firm*—Foley & Lardner

[57] ABSTRACT

An article layout device which comprises an article data input section, a column shape data generation section to divide the article space into a plurality of columns, a column layout order generation section to provide the generated columns with the layout orders, an article layout order generation section to provide the article data with the layout orders, a layout source data synthesis section to newly synthesize the division result of the article space, the column layout order and the article data layout order, an allocation section to allocate the article data to the columns according to the column layout order and the article data layout order, a layout result evaluation section to evaluate the layout results by the allocation section, an optimum layout result retrieval section to detect the layout result according to the evaluation result by the layout result evaluation section and an article output section to lay out and output the article data on the article space according to the layout result detected by the optimum layout result retrieval section.

22 Claims, 18 Drawing Sheets

FIG. 10

| ARTICLE LAYOUT ORDER | 1 | 2 | 3 | 4 | 5 | 6 | 7 | 8 | 9 | 10 |
|---|---|---|---|---|---|---|---|---|---|---|
| ARTICLE NUMBER | 1 | 6 | 4 | 7 | 2 | 3 | 8 | 9 | 10 | 5 |

FIG. 11

| ARTICLE NO. | FIELD | CONTENTS | RESTRICTION |
|---|---|---|---|
| 1 | TITLE | TITLE | AT LEAST 2/3 COLUMNS |
| 2 | SPORTS | NOMO YESTERDAY | AT LEAST 30 CHAR. |
| 3 | SPORTS | PHOTO OF NOMO YESTERDAY | AT LEAST 320 x 200 dots |
| 4 | SPORTS | YESTERDAY'S SCORES OF PROFESSIONAL BASEBALL GAMES | AT LEAST 10 CHAR. HORIZONTALLY |
| 5 | ECONOMY | STOCK PRICES YESTERDAY | AT LEAST 20 x 40 CHAR. |
| 6 | POLITICS | IMMEDIATE REPORTS OF ELECTION | AT LEAST 10 CHAR. |
| 7 | POLITICS | U.S.-JAPAN SEMICONDUCTOR FRICTION | AT LEAST 50 CHAR. |
| 8 | INDUSTRY | NEC'S ANNOUNCEMENT OF NEW PC | AT LEAST 20 CHAR. |
| 9 | INDUSTRY | PHOTO OF NEW PC | AT LEAST 80 x 80 dots |
| 10 | INDUSTRY | NEW PC SPECIFICATIONS | AT LEAST 20 x 30 CHAR. |

| ARTICLE NO. | ARTICLE APPEARANCE PRIORITY |
|---|---|
| 1 | 10 |
| 2 | 20 |
| 3 | 5 |
| 4 | 2 |
| 5 | 16 |
| 6 | 11 |
| 7 | 15 |
| 8 | 17 |
| 9 | 8 |

601

2

(AFTER RE-ALLOCATION)

ARTICLE LAYOUT DEVICE FOR AUTOMATIC COLUMN TEXT LAYOUT

BACKGROUNDS OF THE INVENTION

1. Field of the Invention

The present invention relates to an article layout device for automatic layout of column text to be used in word processors, desktop publishing systems or newspaper/magazine editing systems.

2. Description of the Related Art

An article layout device is used to improve the operability of word processors and desktop publishing systems for layout of column text. Conventional article layout devices of this type include those disclosed in Japanese Patent Application Laid-open Print (Kokai) No. Heisei 3-176148 "Document Layout Editing Device", Japanese Patent Application Laid-open Print (Kokai) No. Heisei 4-263357 "Information Processor", Japanese Patent Application Laid-open Print (Kokai) No. Heisei 5-61871 "Automatic Complicated Document Processor" and Japanese Patent Application Laid-open Print (Kokai) No. Heisei 4-70956 "Document Processor". These conventional examples will be described below.

According to the first conventional method, an article layout device disclosed in the Japanese Patent Application Laid-open Print (Kokai) No. Heisei 3-176148 "Document Layout Editing Device" comprises a frame display means to allocate the document component data specified by the user and an allocation means to allocate the data so that the areas corresponding to the frames do not overlap any existing areas in response to the allocation execution instruction from the user and is thus capable of document column control by easy operation.

FIGS. 21 to 25 show examples of the display screen when the article layout device disclosed in the above laid-open print executes the article layout processing. Described below is the procedure to lay out a new area #1 to the space already having the area #0 as shown in FIG. 21. For this, as shown in FIG. 22, a temporary frame (expressed with bold lines) 601 is displayed so that the user moves it to determine the layout position. Then, as shown in FIG. 23, the newly set area #1 is deformed so as to avoid the already laid out area #0. FIGS. 24 and 25 show the display screens when further setting an area #2 to the space as shown in FIG. 23.

According to the second conventional method, an article layout device as disclosed in the Japanese Patent Application Laid-open Print (Kokai) No. Heisei 4-263357 "Information Processor" comprises a layout means to change the size of the areas to lay out the document component data on the screen according to the layout situation of the applicable areas. The layout means keeps the total balance by, when the master area size is changed, changing the slave area size corresponding to the master area size after such change, according to the master-slave relation set between the areas.

FIG. 26 illustrates the operation of article layout processing by an article layout device disclosed in the above laid-open print. The areas "b" and "d" in the figure have the master-slave relation. Suppose, as shown in FIG. 26 (A), the amount of text supplied to the area "b" is small for the applicable area size and represents about 60% of allocation ratio. In this case, the layout means automatically adjusts or reduces the size of the area "b" in order for a proper allocation ratio. At the same time, the layout means automatically enlarges the area "d" serving as the slave of the area "b" within the proper allocation ratio range as shown in FIG. 26 (B).

According to the third conventional method, an article layout device disclosed in the Japanese Patent Application Laid-open Print (Kokai) No. Heisei 5-61871 "Automatic Complicated Document Processor" comprises an actual data storage to store the actual data of the document components, a format data storage to store the format data such as the document size to be made and the layout positions and sizes of the actual data, and an association data storage to store the association data to show the adaptability and association between the actual data and the format data. It extracts the actual data adaptable to the format data according to the format data and the association data and lays out the actual data according to such format data.

FIG. 27 is a flowchart to illustrate the operation of article layout processing by an article layout device as disclosed in the above laid-open print. Referring to the figure, the device extracts the actual data adaptable to the format data according to the format data and the association data at Step 2703. At Step 2704, it prepares a complicated document according to the extracted format and actual data.

According to the fourth conventional method, an article layout device disclosed in the Japanese Patent Application Laid-open Print (Kokai) No. Heisei 4-70956 "Document Processor" comprises an adjustment means to adjust the character pitch and the character size. The adjustment means adjusts the character pitch and character size according to the distance from the initial character position to the line end position for the final character in a certain line. Thus, the processor lays out the characters so that the width of the frame for character layout is almost filled with the string.

FIG. 28 illustrates examples of display screens when an article layout device disclosed in the above laid-open print executes the article layout processing. In (A) to (F) of FIG. 28, the left display screen shows the status before the layout processing execution and the right display screen shows the status after the layout processing execution. The left display screen of FIG. 28 (A) shows the status where a string 612 is simply input to a character developing frame 611 for document layout. In the right display screen of FIG. 28 (A), the string from the initial character "A" to the final character "G" is converted to an enlarged string 613. Thus, the characters are arranged so that they almost fill the width of the character developing frame 611.

In FIG. 28 (B), the string 612 is converted into another string 614 with a different pitch between characters. Thus, the characters are arranged so that they almost fill the character developing frame 611.

In FIG. 28 (C), the characters in the string 612 are changed to have an increased width (without changing their height) so that a string 615 after such change has the characters arranged to almost fill the character developing frame 611.

In (D) to (F) of FIG. 28, a string 616 with two lines is input to the character developing frame 611. In FIG. 28 (D), the character pitch is reduced without changing the size of the individual characters so that a string 617 after conversion has the characters arranged to almost fill the character developing frame 611.

In FIG. 28 (E), a range "L" is specified in the character developing frame 611. By converting the characters in the specified range "L" among those in a string 618 into smaller size characters (String 620), the device arranges the characters so that the entire string almost fills the character developing frame 611.

In FIG. 28 (F), a range "L" is specified in the character developing frame 611. By converting the characters in the specified range "L" among those in a string 621 into larger size characters, a string 622 after conversion has the characters arranged to almost fill the character developing frame 611.

According to the prior art as described above, the size and position of the frames to lay out the document component data can be relatively easily determined by using the first to the third conventional methods properly. By combining the first to third conventional methods and the fourth conventional method, strings can be finely laid out in a frame.

However, these conventional article layout devices have the following drawbacks.

Firstly, they require manual operation for execution of the article layout processing. Certainly, the article layout processing can be executed with easy operation by properly combining some conventional methods. However, such methods contain interactive procedures for active frame selection and transfer or deformation of the selected frame. Thus, they require troublesome manual operation to adjust the position, size or shape of frames in the article layout processing as shown for the first conventional method.

Secondly, the shape and size of the area occupied by the article data are generally unknown while the available shape and size ranges for the frames to accommodate the supplied article data are fixed. It is quite difficult to observe the specified number of pages or to lay out all of the supplied articles when the number of printed pages and/or the sheet size are restricted as the layout condition. For example, the second conventional method aims at layout of all article data and the third conventional method aims at layout of all format data. They do not have any process to observe the predetermined restrictions including the number of printed pages or paper size. In particular, the third conventional method does not have any mechanism to adjust the frame size. Though the second conventional method has a limited size adjustment mechanism, considering the current difficulty in automatic text summarization according to the predetermined amount, the article data can be packed according to the size and shape of the frames only in a quite limited range even using the forth conventional method at the same time.

Thirdly, they have only a poor adjustment function for article layout areas set on the article space, and it is difficult to flexibly lay out the areas according to the request from the user. In other words, it is likely to leave an empty area in the article space in certain cases. They cannot adjust the area positions, and they can adjust the area size only between the associated areas. Even when using the second conventional method, which is the only method with a frame thickness adjustment function, it is likely to leave worthless empty areas in automatic layout. This is because the above method does not have a frame position adjustment function. Since the frame sizes can be adjusted only when the areas are in the master-slave relation, they can be adjusted effectively only in a few cases.

SUMMARY OF THE INVENTION

It is an object of the present invention to provide an article layout device which can largely reduce the labor required for layout work by eliminating the need of human intervention for good layouts and by enabling automatic processing from article acquisition to printing.

It is another object of the present invention in addition to above to provide an article layout device with which the article space is expected to be used efficiently by enabling trials of complicated combination of articles.

According to one aspect of the invention, an article layout device for layout of document on which a plurality of article data with some columns are laid out comprises an article data input means for inputting the article data;

a column generation means for dividing the article space to lay out the article data into a plurality of columns with random shapes;

a column layout order generation means for providing the columns generated by the column generation means with the order of layout processing;

an article layout order generation means for providing the article data with the order of layout processing;

a layout source data synthesis means for synthesizing a new division result of the article space by combining a plurality of division results of the article space divided into some columns by the column generation means, synthesizing a new layout order of the columns by combining a plurality of layout orders for the columns generated by the column layout order generation means and also synthesizing a new layout order of the article data by combining a plurality of layout orders for the article data generated by the article layout order generation means;

an allocation means for allocating the article data to the columns according to the layout order for the columns determined by the column layout order generation means or the column layout order for the columns synthesized by the layout source data synthesis means and the layout order for the article data determined by the article layout order generation means or the layout order for the article data synthesized by the layout source data synthesis means;

a layout result evaluation means for evaluating the layout results output from the allocation means and generating the evaluation values;

an optimum layout result retrieval means, according to the evaluation values generated by the layout result evaluation means, for detecting the layout result with the maximum evaluation value from the layout results output from the allocation means; and an article output means, according to the layout result detected by the optimum layout result retrieval means, for laying out the article data on the article space for output.

In the preferred construction, the column generation means divides the article space into a plurality of columns, generates unit areas by further dividing the plurality of columns, provides the unit areas with the column combination number and generates columns by combining the unit areas having the same column number among the unit areas mutually neighboring for either side.

In the preferred construction, the layout source data synthesis means selects, when synthesizing a new layout order for the columns and a new layout order for the article data in relation to the division result for a new article space, a set serving as a synthesis base for a higher probability in that the set with a high evaluation value generated by the layout result evaluation means is selected from the sets of the existing space division result, the existing column layout order and the existing article data layout order.

In the preferred construction, the layout source data synthesis means repeatedly synthesizes new division results for the article space by combining a plurality of division results for the article space divided into some columns by the column generation means or division results for the article space synthesized by itself, and repeatedly synthesizes new layout orders for the columns by combining a plurality of layout orders for the columns generated by the column layout order generation means or layout orders for the columns synthesized by itself, and repeatedly synthesizes new layout orders for the article data by combining a plurality of layout orders for the article data generated by the article layout order generation means or layout orders for the article data synthesized by itself, and the optimum layout result retrieval means starts its operation on condition that the layout source data synthesis means synthesizes the division results for the article space, the column layout order and the article data layout order for the predetermined number.

In another preferred construction, the layout source data synthesis means repeatedly synthesizes new division results for the article space by combining a plurality of division results for the article space divided into some columns by the column generation means or division results for the article space synthesized by itself, and repeatedly synthesizes new layout orders for the columns by combining a plurality of layout orders for the columns generated by the column layout order generation means or layout orders for the columns synthesized by itself, and repeatedly synthesizes new layout orders for the article data by combining a plurality of layout orders for the article data generated by the article layout order generation means or layout orders for the article data synthesized by itself, and the optimum layout result retrieval means starts its operation on condition that the layout source data synthesis means executes its processing for the predetermined time.

In another preferred construction, the layout source data synthesis means repeatedly synthesizes new division results for the article space by combining a plurality of division results for the article space divided into some columns by the column generation means or division results for the article space synthesized by itself, and repeatedly synthesizes new layout orders for the columns by combining a plurality of layout orders for the columns generated by the column layout order generation means or layout orders for the columns synthesized by itself, and repeatedly synthesizes new layout orders for the article data by combining a plurality of layout orders for the article data generated by the article layout order generation means or layout orders for the article data synthesized by itself, and the optimum layout result retrieval means starts its operation on condition that the layout result evaluation means provides an evaluation value exceeding the predetermined evaluation value for the layout result.

In another preferred construction, the layout source data synthesis means repeatedly synthesizes new division results for the article space by combining a plurality of division results for the article space divided into some columns by the column generation means or division results for the article space synthesized by itself, and repeatedly synthesizes new layout orders for the columns by combining a plurality of layout orders for the columns generated by the column layout order generation means or layout orders for the columns synthesized by itself, and repeatedly synthesizes new layout orders for the article data by combining a plurality of layout orders for the article data generated by the article layout order generation means or layout orders for the article data synthesized by itself, and the optimum layout result retrieval means counts the processing where the evaluation value given by the layout result evaluation means for the set of newly synthesized division result for the article space, the column layout order and the article data layout order does not update the maximum evaluation value before that and starts its operation when the number of such processing exceeds the predetermined number.

Also, the layout source data synthesis means repeatedly synthesizes new division results for the article space by combining a plurality of division results for the article space divided into some columns by the column generation means or division results for the article space synthesized by itself, and repeatedly synthesizes new layout orders for the columns by combining a plurality of layout orders for the columns generated by the column layout order generation means or layout orders for the columns synthesized by itself, and repeatedly synthesizes new layout orders for the article data by combining a plurality of layout orders for the article data generated by the article layout order generation means or layout orders for the article data synthesized by itself, and the optimum layout result retrieval means detects the processing where the evaluation value given by the layout result evaluation means for the set of newly synthesized division result for the article space, the column layout order and the article data layout order does not update the maximum evaluation value before that and, starts its operation on condition that the time of continued processing exceeds the predetermined processing time.

Also, the column generation means normalizes the column combination numbers appearing for the first time so that the numbers are incremented by one in the same direction according to the appearance order.

According to another aspect of the invention, an article layout device for layout of document on which a plurality of article data with some columns are laid out comprises an article data input means for inputting the article data;

a column generation means for dividing the article space to lay out the article data into a plurality of columns with random shapes;

a column layout order generation means for providing the columns generated by the column generation means with the order of layout processing;

an article layout order generation means for providing the article data with the order of layout processing;

a layout source data synthesis means for synthesizing a new division result of the article space by combining a plurality of division results of the article space divided into some columns by the column generation means, synthesizing a new layout order of the columns by combining a plurality of layout orders for the columns generated by the column layout order generation means and also synthesizing a new layout order of the article data by combining a plurality of layout orders for the article data generated by the article layout order generation means;

an allocation means for allocating the article data to the columns according to the layout order for the columns determined by the column layout order generation means or the column layout order for the columns synthesized by the layout source data synthesis means and the layout order for the article data determined by the article layout order generation means or the layout order for the article data synthesized by the layout source data synthesis means;

a layout result evaluation means for evaluating the layout results output from the allocation means and generating the evaluation values;

an optimum layout result retrieval means, according to the evaluation values generated by the layout result evaluation means, for detecting the set having the maximum evaluation value among those containing the article space division result generated by the column generation means and the column layout order generated by the column layout order generation means and the article data layout order generated by the article layout order generation means;

an optimum layout allocation means, according to the set of article space division result and the column layout order and the article data layout order detected by the optimum layout result retrieval means, for allocating the article data to the columns; and an article output means for laying out and outputting the article data on the article space according to the layout result output by the optimum layout allocation means.

In the preferred construction, the allocation means also serves as the optimum layout allocation means.

In the preferred construction, the column generation means divides the article space into a plurality of columns, generates unit areas by further dividing the plurality of columns, provides the unit areas with the column combination number and generates columns by combining the unit areas having the same column number among the unit areas mutually neighboring for either side.

In the preferred construction, the layout source data synthesis means selects, when synthesizing a new layout order for the columns and a new layout order for the article data in relation to the division result for a new article space, a set serving as a synthesis base for a higher probability in that the set with a high evaluation value generated by the layout result evaluation means is selected from the sets of the existing space division result, the existing column layout order and the existing article data layout order.

In another preferred construction, the layout source data synthesis means repeatedly synthesizes new division results for the article space by combining a plurality of division results for the article space divided into some columns by the column generation means or division results for the article space synthesized by itself, and repeatedly synthesizes new layout orders for the columns by combining a plurality of layout orders for the columns generated by the column layout order generation means or layout orders for the columns synthesized by itself, and repeatedly synthesizes new layout orders for the article data by combining a plurality of layout orders for the article data generated by the article layout order generation means or layout orders for the article data synthesized by itself, and the optimum layout result retrieval means starts its operation on condition that the layout source data synthesis means synthesizes the division results for the article space, the column layout order and the article data layout order for the predetermined number.

In another preferred construction, the layout source data synthesis means repeatedly synthesizes new division results for the article space by combining a plurality of division results for the article space divided into some columns by the column generation means or division results for the article space synthesized by itself, and repeatedly synthesizes new layout orders for the columns by combining a plurality of layout orders for the columns generated by the column layout order generation means or layout orders for the columns synthesized by itself, and repeatedly synthesizes new layout orders for the article data by combining a plurality of layout orders for the article data generated by the article layout order generation means or layout orders for the article data synthesized by itself, and the optimum layout result retrieval means starts its operation on condition that the layout source data synthesis means executes its processing for the predetermined time.

In another preferred construction, the layout source data synthesis means repeatedly synthesizes new division results for the article space by combining a plurality of division results for the article space divided into some columns by the column generation means or division results for the article space synthesized by itself, and repeatedly synthesizes new layout orders for the columns by combining a plurality of layout orders for the columns generated by the column layout order generation means or layout orders for the columns synthesized by itself, and repeatedly synthesizes new layout orders for the article data by combining a plurality of layout orders for the article data generated by the article layout order generation means or layout orders for the article data synthesized by itself, and the optimum layout result retrieval means starts its operation on condition that the layout result evaluation means provides an evaluation value exceeding the predetermined evaluation value for the layout result.

In the above-mentioned construction, the layout source data synthesis means repeatedly synthesizes new division results for the article space by combining a plurality of division results for the article space divided into some columns by the column generation means or division results for the article space synthesized by itself, and repeatedly synthesizes new layout orders for the columns by combining a plurality of layout orders for the columns generated by the column layout order generation means or layout orders for the columns synthesized by itself, and repeatedly synthesizes new layout orders for the article data by combining a plurality of layout orders for the article data generated by the article layout order generation means or layout orders for the article data synthesized by itself, and the optimum layout result retrieval means counts the processing where the evaluation value given by the layout result evaluation means for the set of newly synthesized division result for the article space, the column layout order and the article data layout order does not update the maximum evaluation value before that and starts its operation when the number of such processing exceeds the predetermined number.

In the above-mentioned construction, the layout source data synthesis means repeatedly synthesizes new division results for the article space by combining a plurality of division results for the article space divided into some columns by the column generation means or division results for the article space synthesized by itself, and repeatedly synthesizes new layout orders for the columns by combining a plurality of layout orders for the columns generated by the column layout order generation means or layout orders for the columns synthesized by itself, and repeatedly synthesizes new layout orders for the article data by combining a plurality of layout orders for the article data generated by the article layout order generation means or layout orders for the article data synthesized by itself, and the optimum layout result retrieval means detects the processing where the evaluation value given by the layout result evaluation means for the set of newly synthesized division result for the article space, the column layout order and the article data layout order does not update the maximum evaluation value before that and, starts its operation on condition that the time of continued processing exceeds the predetermined processing time.

Also, the column generation means normalizes the column combination numbers appearing for the first time so that the numbers are incremented by one in the same direction according to the appearance order.

Also, the layout data group storage means deletes data with the corresponding evaluation value data, when required to store more sets than predetermined, starting from the sets with lower evaluation values given by the layout result evaluation means among the sets of the article space division result, the column layout order and the article data layout order so as to store a new set of data.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 10 is a table to show the relation between the article layout orders and the article numbers;

FIG. 11 is a table to show an example of article shape restrictions;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

<First Embodiment>

Figure 1:
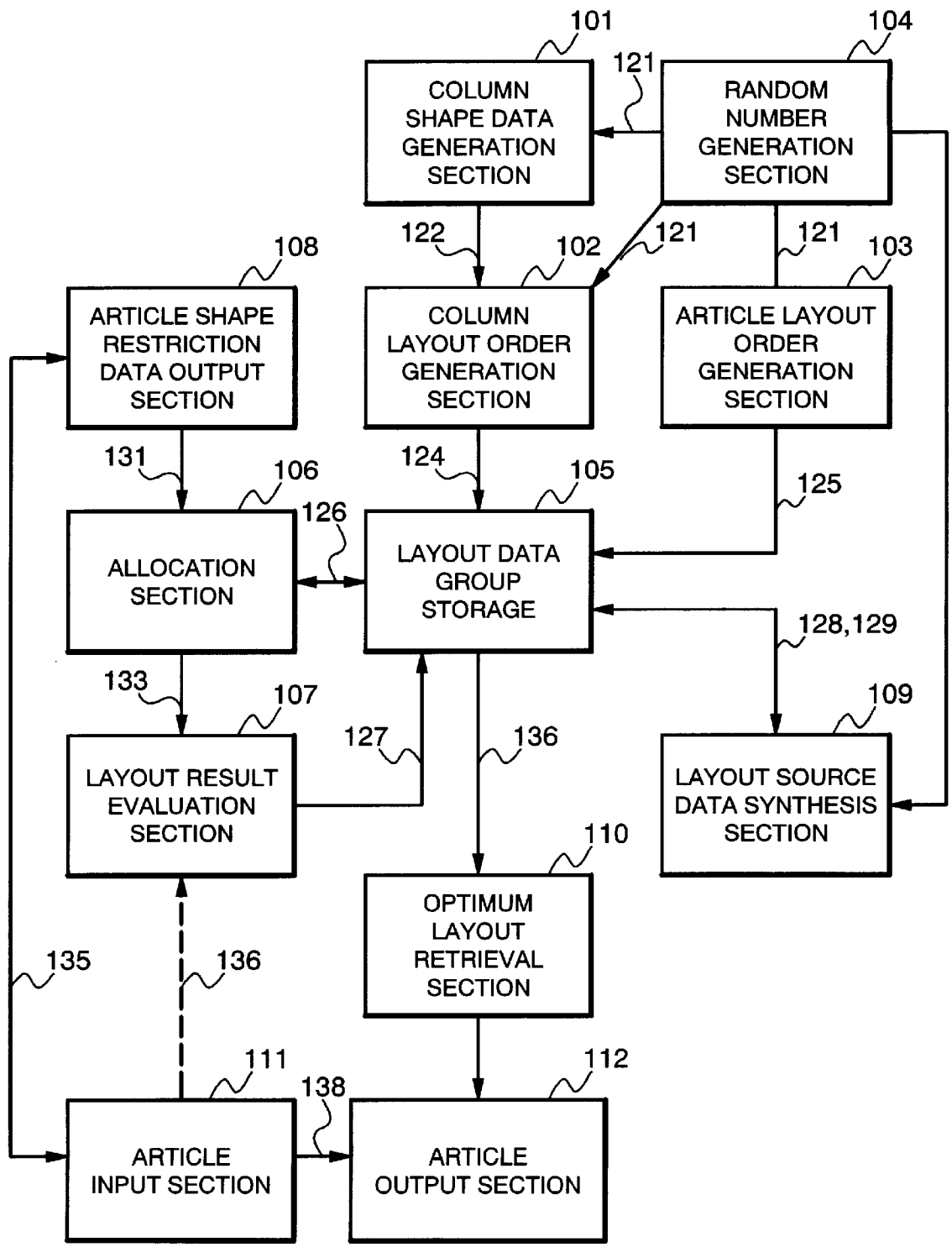
FIG. 1 is a block diagram to show the configuration of an article layout device according to a first embodiment of the present invention.

FIG. 1 is a block diagram to show the configuration of an article layout device according to a first embodiment of the present invention.

As shown in the figure, an article layout device of this embodiment comprises a column shape data generation section 101, a column layout order generation section 102, an article layout order generation section 103, a random number generation section 104, a layout data group storage 105, an allocation section 106, a layout result evaluation section 107, an article shape restriction data output section 108, a layout source data synthesis section 109, an optimum layout retrieval section 110, an article input section 111 and an article output section 112. Note that FIG. 1 just shows the characteristic components of this embodiment with omitting other general components.

In the above configuration, the column shape data generation section 101, the column layout order generation section 102, the article layout order generation section 103, the random number generation section 104, the allocation section 106, the layout result evaluation section 107, the article shape restriction data output section 108, the layout source data synthesis section 109 and the optimum layout retrieval section 110 are, for example, achieved by a CPU (Central Processing Unit) under control by the computer program stored in a RAM or other internal memories or magnetic disks or other external storage devices. The computer program is supplied as the record in magnetic disks or other recording media. The layout data group storage 105 is achieved by a RAM or other internal memories or magnetic disks or other external storage devices. The article input section 111 is achieved by a RAM or other internal memories or magnetic disks or other external storage devices and an interface device for a certain network so that the article data as the processing subject is input. The article output section 112 is achieved by a printer or a CRT display so that the procedure steps of the article layout processing and the article after execution of the article layout processing are printed out or displayed.

The column shape data generation section 101 reads a random number 121 from the random number generation section 104 and generates a column shape data 122 using such random number 121. The generated column shape data 122 is supplied to the column layout order generation section 102.

The column layout order generation section 102 reads a random number 121 from the random number generation section 104 and determines the order of layout processing for the columns using such random number 121. It adds the determined order data to the column shape data 122 input from the column shape data generation section 101 and stores them at the layout data group storage 105.

The article layout order generation section 103 reads a random number 121 from the random number generation section 104 and determines the order of layout processing for the articles using such random number 121 and stores the determined order data at the layout data group storage 105.

The random number generation section 104 generates random numbers 121 and supplies them to the column shape data generation section 101, the column layout order generation section 102, the article layout order generation section 103 and the layout source data synthesis section 109.

The layout data group storage 105 stores the predetermined number of layout data. A layout data here includes a column shape data with column layout order 124, an article layout order 125, a layout result 126 and an evaluation value 127. The column shape data with column layout order 124 is input from the column layout order generation section 102, the article layout order 125 from the article layout order generation section 103, the layout result 126 from the allocation section 106 and the evaluation value 127 from the layout result evaluation section 107. In addition, a column shape data with column layout order 128 and an article layout order 129 are input from the layout source data synthesizing section 109 for storage.

The layout data group storage 105 has, at a certain step of processing, the column shape data with column layout order 124 and the article layout order 125 read out by the allocation section 106, the column shape data with column layout order 128 and the article layout order 129 read out by the layout source data synthesis section 109, the layout result 126 read out by the allocation section 106 and the evaluation value 127 by the layout result evaluation section 107.

The allocation section 106 reads out the column shape data with column layout order 124 and the article layout order 125 from the layout data group storage 105, reads out an article shape restriction data 131 from the article shape restriction data output section 108 and, according to these data, allocates the articles to the columns where they can be laid out. Then, it outputs the layout result 126 obtained as the result of such article allocation to the columns to the layout data group storage 105 and the layout result evaluation section 107.

The layout result evaluation section 107 has a layout result 133 input from the allocation section 106 and stores the evaluation value 127, which is a numeric expression of evaluation for the layout result 133, to the layout data group storage 105.

The article shape restriction data output section 108 has an article data 135 input from the article input section 111, extracts the shape restriction data of the articles and outputs them to the allocation section 106. The shape restriction data here includes the maximum and minimum length and width ratios, and the maximum and minimum lengths and widths, for example.

The layout source data synthesis section 109 synthesizes a new layout source data according to the layout source data and a random number read out from the random number generation section 104 and stores it in the layout data group storage 105. The layout source data here includes the column shape data with the column layout order 124 and the article layout order 125 read out from the layout data group storage 105.

The optimum layout retrieval section 110 retrieves the maximum evaluation value 127 from the layout source group storage 105, reads out a layout result 136 corresponding to the retrieved maximum evaluation value 127 and sends it to the article output section 112.

The article input section 111 sends article data 135 and 138 including the article contents and incidental data to the article shape restriction data output section 108 and the article output section 112.

The article output section 112 has the layout result 136 input from the optimum layout retrieval section 110 and the article contents (document component data) as the article data 135 from the article input section 111 and, according to the input layout result 136, displays the articles on the screen or prints them out on paper.

Next, the operation of the article layout device with the above configuration will be described below.

Figure 2:
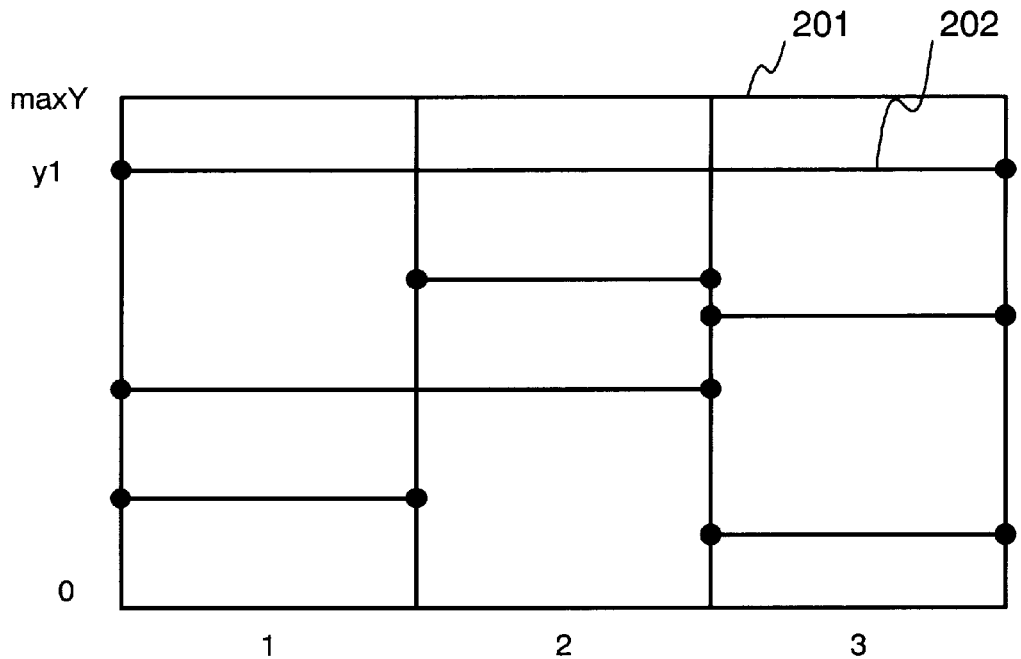
FIG. 2 is an explanatory view to show the first step of the unit area generation in the column generation procedure according to the first embodiment.
Figure 3:
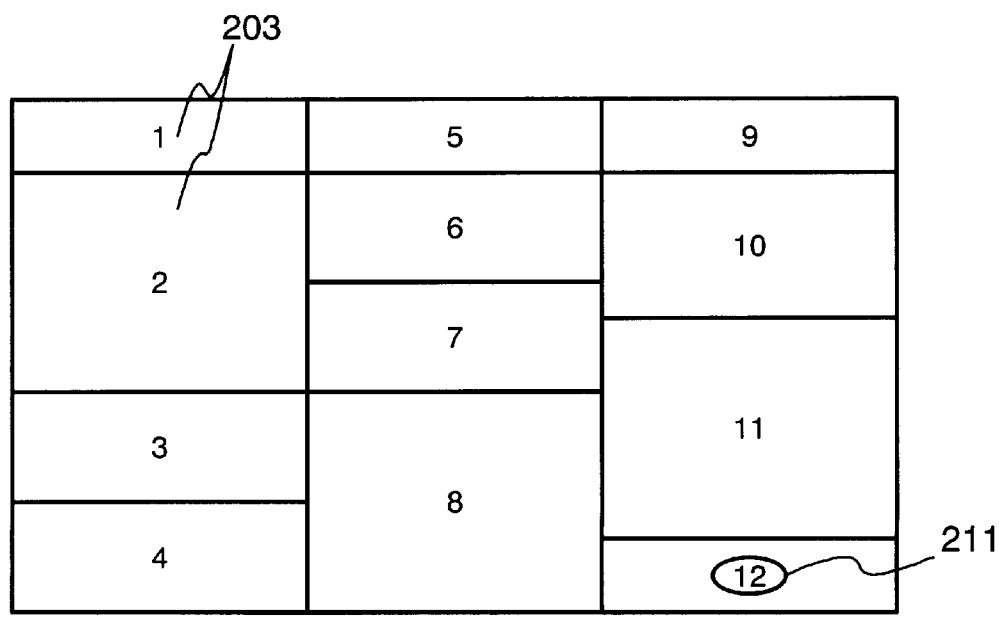
FIG. 3 is an explanatory view to show the second step of the unit area generation in the column generation procedure according to the first embodiment.

FIGS. 2 and 3 illustrate the unit area generation process in the column generation procedure according to this embodiment. FIGS. 4 to 7 illustrate the process to combine the unit areas to generate a column according to this embodiment. Note that FIGS. 4 to 7 show an example when the procedure is continued from the statuses in FIGS. 2 and 3 and FIGS. 5 and 7 show the results of column division for the article space in the layout procedure according to this embodiment. For example, an article space 301 or an article space 401 as shown in FIGS. 4 to 7 has three columns in horizontal direction and a column 311 in FIG. 5 has a width for two columns at maximum (for one column at minimum) and a column 312 in the figure has a width for one column.

Figure 5:
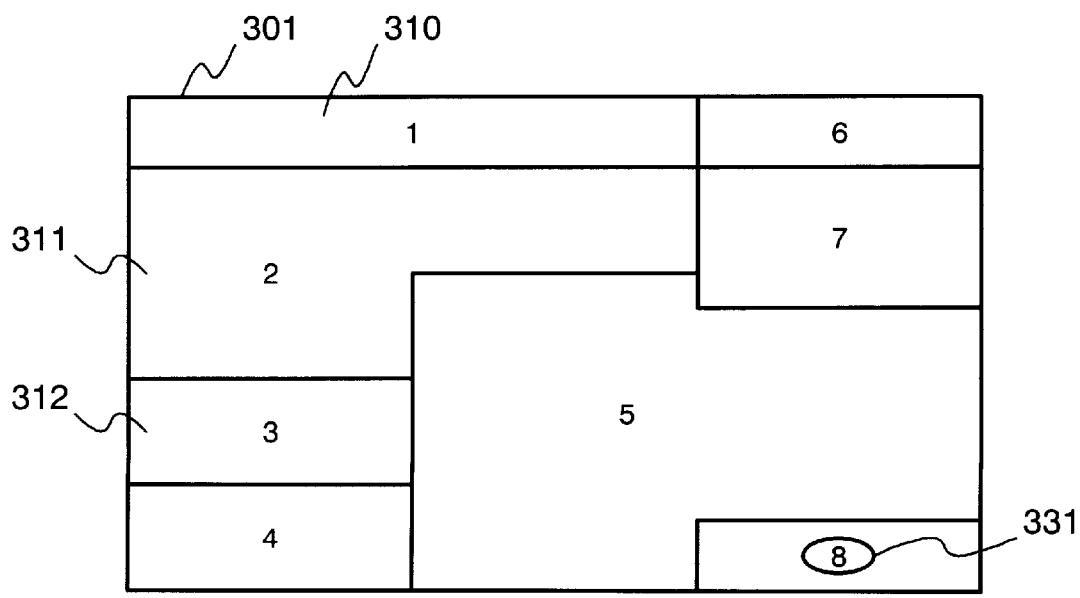
FIG. 5 is an explanatory view to show the result when the article space is divided into columns in the example of FIG. 4.
Figure 7:
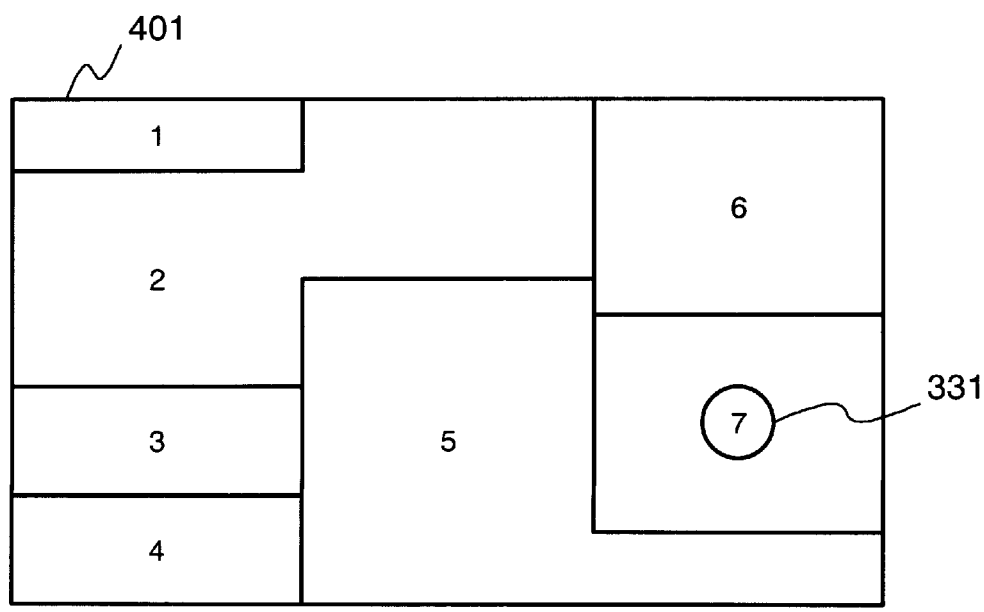
FIG. 7 is an explanatory view to illustrate the result when the article space is divided into columns in the example of FIG. 6.

The articles are laid out on the article space with selecting the articles corresponding to the columns. The columns in the article space are set by the column generation section 101, which divides the article space into some random areas as shown in FIGS. 5 and 7. The column setting data are supplied to the column layout order generation section 102.

The column generation section 101 generates the columns as follows. It firstly determines the number of columns. If the number of columns is uniquely specified in advance, such number is used. If not, a random number 121 is read out from the random number generation section 104 within the predetermined range of values and the number of columns is fixed with the read out random number 121. In the description below, the lines to separate the columns are called "column lines". In the example of FIGS. 2 and 3, there are two column lines. In the example of FIGS. 2 to 7, the column lines are expressed as vertical lines.

Then, the column generation section 101 generates lines which make right angles with the column lines. In the description below, such lines are called "divisional lines". A divisional line is defined by the coordinate on the coordinate axis perpendicular to the column formation direction (Y axis in FIGS. 2 to 7) and the starting column and the ending column of the line. For example, a divisional line 202 in FIG. 2 has the coordinate y1, the starting column No. 1 and the ending column No. 3. The example of FIG. 2 has six divisional lines. A random number 121 is read out from the random number generation section 104 within the predetermined range of numbers so that the number of divisional lines is determined with the read out random number 121, and the coordinate, the starting column and the ending column are determined for such number using the random number read out again from the random number generation section 104. As a result, the divisional lines as shown in FIG. 2 are obtained, for example. Since the number and position of the divisional lines are determined according to the random number 121 input from the random number generation section 104, different number of divisional lines are obtained at different positions for every divisional line generation processing usually.

By thus generating the number of columns and divisional lines, an article space 201 of FIG. 2 is divided into several areas. These areas are called the "unit areas". In case of FIG. 2, the space is divided into 12 unit areas. As shown in FIG. 3, unit areas 203 are numbered for distinction from other unit areas 203. A number given here is referred to as a unit area number 211. The numbers "1" to "12" in FIG. 3 are the unit area numbers 211.

Figure 4:
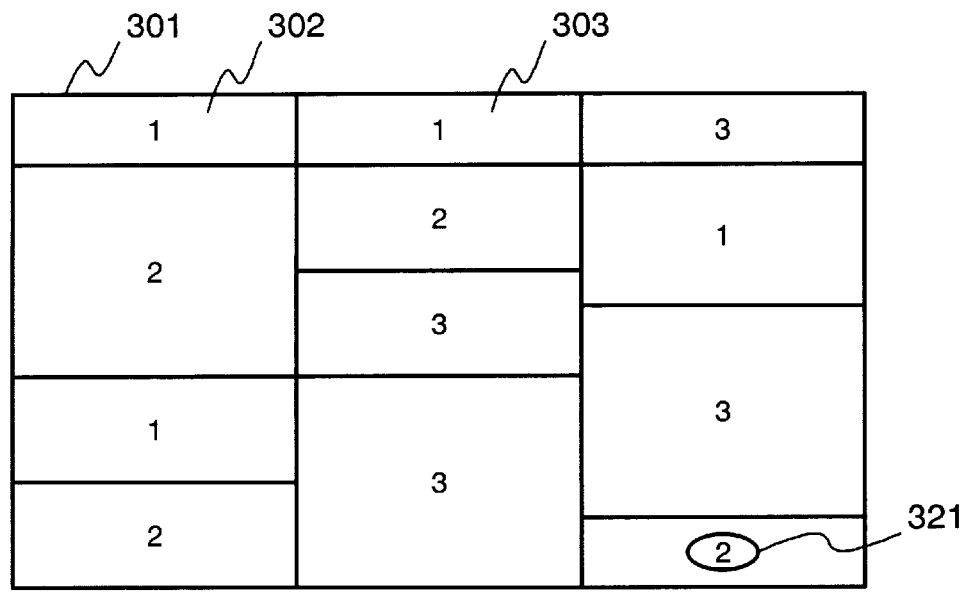
FIG. 4 is an explanatory view to illustrate an example of column generation processing by combining unit areas according to the first embodiment.
Figure 6:
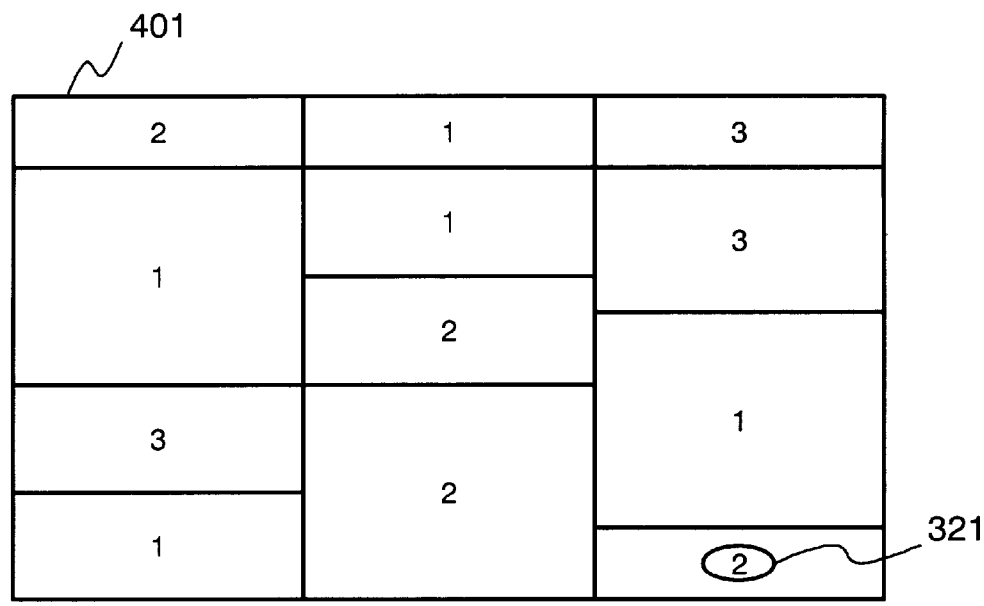
FIG. 6 is an explanatory view to illustrate another example of column generation by combining unit areas according to the first embodiment.

Then, the column generation section 101 reads out a random number 121 within the predetermined range of values from the random generation section 104 and numbers the unit areas 203 using the read out random number 121. A number given here is called a column combination number 321. For example, the number "1", "2" or "3", given to the unit areas in FIG. 4 or 6 is the column combination number 321. Specifically, the unit areas 203 with the unit area number "1" in FIG. 3 has "1" in FIG. 4 and "2" in FIG. 6 as the column combination number 321.

Finally, when the unit areas 211 adjacent to (above, below, on the left or right of) a unit area have the same column combination number 321 as that unit area, such unit areas are combined to make a single column. Eight columns are generated in the example of FIG. 5 and seven columns are generated in the example of FIG. 7. Specifically, with referring to FIGS. 3 and 4, a unit area 302 with the unit area number "1" and a unit area 303 with the unit area number "5" has the same number "1" as the column combination number 321 and these unit areas are combined to form a single column 310. Further, as shown in FIG. 5, the generated columns are numbered for distinction from others. In the description below, a number given here is called a column number 331. The number given to the columns in FIGS. 5 and 7 are the column numbers 331.

Columns are thus generated and the column shape data for the generated columns are output to the column layout order generation section 102. The column shape data here means the number of columns, the number of divisional lines, divisional line definitions (expressed with the coordinate, the starting column and the ending column) and the column combination number string. Since the columns are generated and the column shape data are determined according to the random number 121 input from the random number generation section 104, as understood from comparison of FIGS. 5 and 7, the number and shape of the generated columns are different each time.

Figure 8:
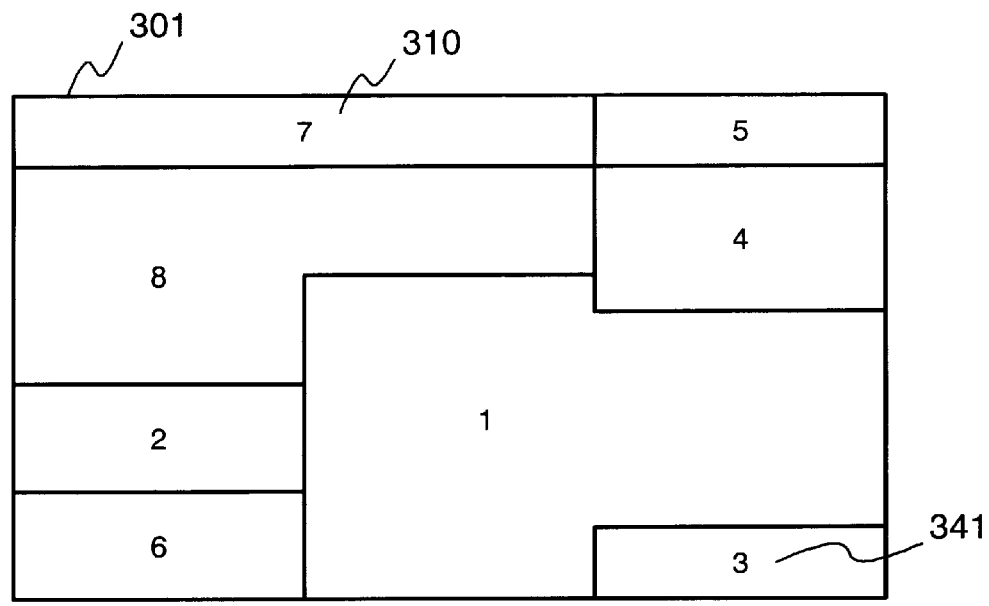
FIG. 8 is a view to show an example where the layout orders are given to the columns in the example shown in FIGS. 4 and 5.
Figure 9:
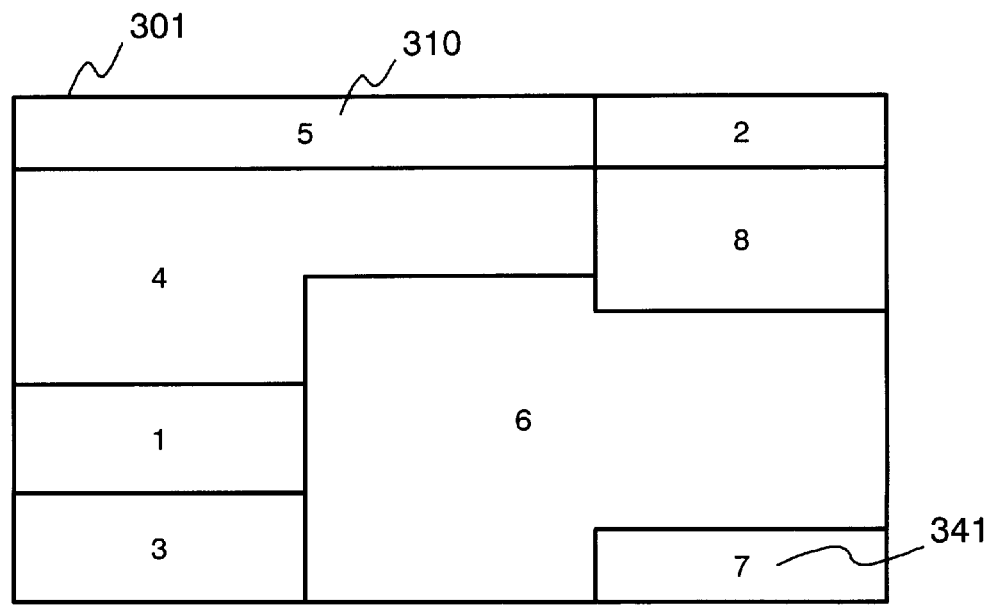
FIG. 9 is a view to show another example where the layout orders are given to the columns in the example shown in FIGS. 4. and 5.

Referring to FIGS. 1, 8 and 9, the procedure to generate the order or column layout execution will be described below. FIGS. 8 and 9 illustrate an example where the allocation section 106 gives the order of layout processing (priority) to the columns divided as shown in FIG. 5. To the column 310, for example, the seventh priority is provided in FIG. 8 and the fifth priority is provided in FIG. 9 for layout processing.

The column layout order generation section 102 firstly uses a random number 121 read out from the random generation section 104 to determine the processing order of the columns. In the description below, a determined order is called a column processing order 341. The column processing order 341 is allocated to the columns in one-to-one correspondence using the random number string without any repeated number within the range from "1" to the number corresponding to the number of columns. Since the column processing order 341 is determined according to the random number 121 input from the random number generation section 104, different column processing order 341 is obtained each time. The column layout order generation section 102 outputs the column shape data and the column processing order as shown in FIGS. 8 and 9 to the layout data group storage 105 as the processing results.

Referring now to FIG. 10, the generation of the order for article layout processing will be described below. FIG. 10 shows the relation between the article layout orders 125 and the article numbers. Specifically, to the articles as shown in FIG. 11 input from the article input section 111 of FIG. 1, the allocation section 106 gives the layout processing execution order (priority). In the example of FIG. 10, the first priority is given to the article with number "1", and the sixth priority to the article with number "3" for the layout processing.

The article layout order generation section 103 firstly uses a random number 121 read out from the random generation section 104 to provide the processing execution order to the articles. In the description below, the order given to the articles are called the layout order. The layout order is allocated to the articles in one-to-one correspondence using the random number string without any repeated number for the range from "1" to the number corresponding to the number of articles. Since the article layout order is determined according to the random number 121 input from the random number generation section 104, different article layout order is obtained each time. The article layout order generation section 103 outputs the processing order of the articles as shown in FIG. 10 to the layout data group storage 105 as the processing result.

Then, referring to FIG. 11, the article shape restriction will be described. FIG. 11 shows an example of shape restriction for the articles to be processed according to this embodiment. Though one restriction is described for each of the articles with numbers "1" to "10" in FIG. 11, an article usually has several restrictions in the actual operation. In FIG. 11, for example, the article with the article number "1" requires a space for at least two columns for three-column layout and the article with article number "2" requires a space to accept at least 30 characters.

The article shape restriction data output section 108 extracts the article shape restriction data 131 for the articles as shown in FIG. 11 from the article data 135 input from the article input section 111 and outputs them to the allocation section 106. The article shape restriction data 131 is extracted as follows.

The article shape restriction data output section 108 stores the data about general shape restrictions such as the maximum and the minimum length and width ratios and the maximum and minimum lengths and widths predetermined for application to all articles. It also stores, if necessary, the individual shape restriction data such as the maximum and minimum image sizes and fonts, maximum and minimum character pitches and line intervals, and the maximum and minimum ratios between the character pitch and line intervals predetermined corresponding to the field and other certain conditions of the articles.

The article shape restriction data output section 108 firstly reads out the article data 135 from the article input section 111 and obtains the data peculiar to the articles including the article field, the number of characters for the paragraphs, the number of characters for the entire document, the source image size and the numbers of characters in the horizontal and vertical directions in the tables. It mixes the shape restriction data applied to all articles and the shape restriction data for each field it stores and generates the article shape restriction data 131 for each article to be output to the allocation section 106. For example, according to the number of characters in the vertical direction (10 char.) on the score table having "4" as the article number, the minimum font used for the score table and the minimum character pitch, it determines the minimum width of the column required to lay out the article of article number "4" and outputs such width to the allocation section 106.

Then, referring to FIGS. 4, 5 and 9 to 11, the allocation processing to lay out the articles to the applicable columns by correspondence between the columns and the articles will be described below.

The allocation section 106 reads out the column shape data with the column layout order 124 and the article layout order 125 from the layout data group storage 105 and reads out the article shape restriction data 131 from the article shape restriction data output section 108. Then, according to the read out data, it allocates the articles from those with higher layout priorities to the columns with higher layout orders among the columns usable for layout. Thus, the articles are laid out to the columns. The obtained layout result is sent from the allocation section 106 to the layout data group storage 105 and the layout result evaluation section 107. Then, the layout result evaluation section 107 judges whether the articles can be laid out to the allocated columns. Here, the column shape data is used for judgment whether the articles can be laid out or not. For example, the article with the article number "1" has a shape restriction that it requires the width for two columns in the space of three-column width. Thus, it is judged acceptable when the article is allocated to the column 310 having a width for two columns, but is not judged acceptable when it is allocated to a column 312 with a width for one column only. In addition, any column that already has an allocated article naturally cannot accept another article.

Then, referring to the flowchart of FIG. 12, the operation of the allocation section 106 will be described in details below.

Figure 12:
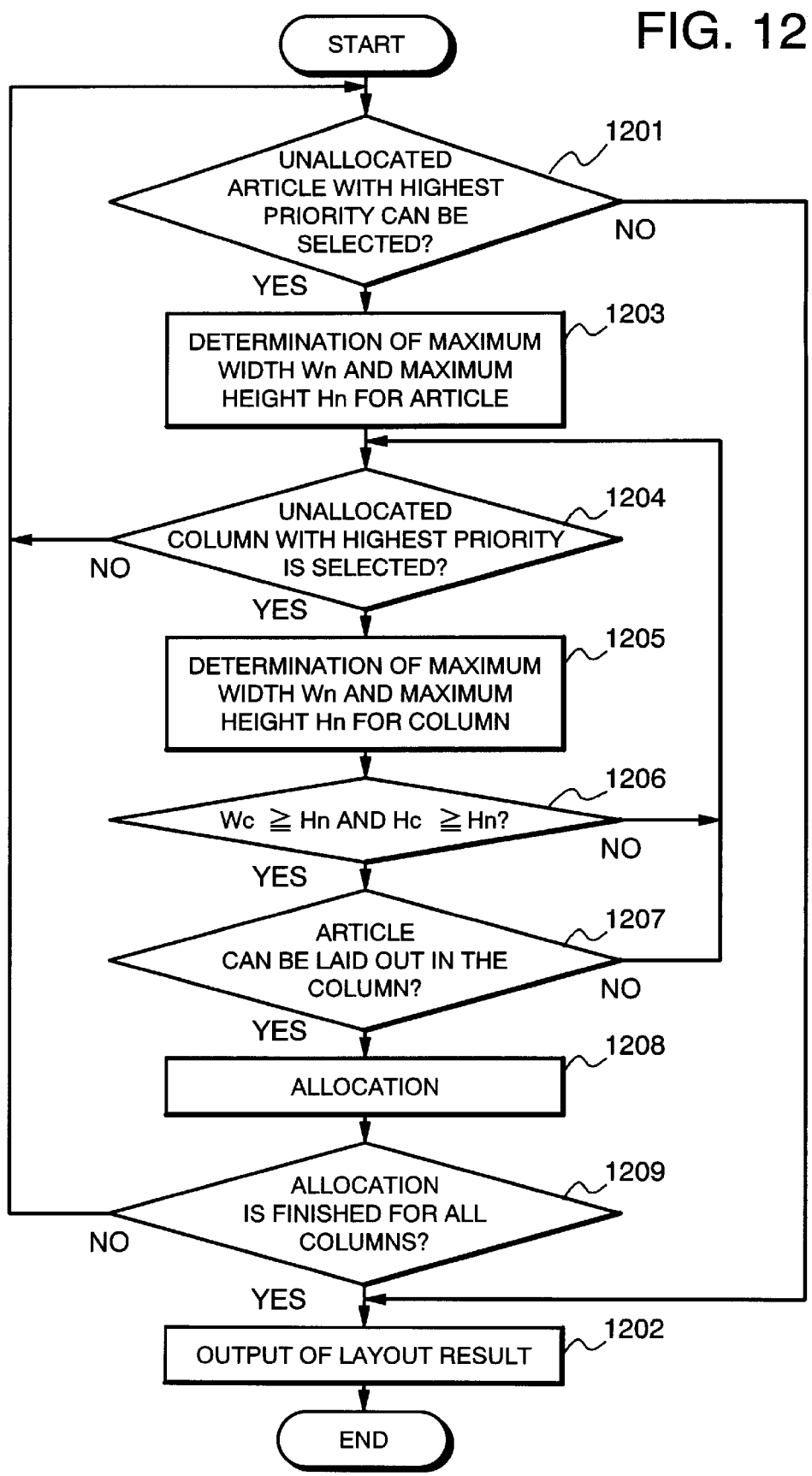
FIG. 12 is a flowchart to illustrate the operation of the allocation section according to the first embodiment.

FIG. 12 shows the control operation of the allocation section 106 according to the first embodiment. The allocation section 106 refers to the article layout order 125 read out from the layout data group storage 105 and checks whether the article with the highest layout priority among the articles not yet allocated to any column can be selected as the processing subject or not (Step 1201). If there is no article to be selected, it outputs the layout result and terminates the procedure (Step 1202).

If the allocation section 106 can select the article with the highest layout priority as the processing subject at Step 1201, it reads out the shape restriction data 131 corresponding to the selected article from the article shape restriction data output section 108 to determine the maximum width Wn and the maximum height Hn for the article (Step 1203). Then, referring to the column layout order read out from the layout data group storage 105, it selects the column with the highest layout priority among those not yet allocated for any article and not yet subjected to the processing from Step 1205 as the processing subject (Step 1204). If it does not find any column to be selected here, it returns to Step 1201 and selects the article with the second highest priority for the same processing.

When the allocation section 106 finds any column to be selected as the subject for article allocation, it determines the maximum width Wc and the maximum height Hc for the applicable column according to the shape data concerning the column (Step 1205). Then, it compares the maximum width Wn and the maximum height Hn for the article determined at Step 1203 with the maximum width Wc and the maximum height Hc for the column determined at Step 1205. If Wc≧Wn and Hc≧Hn, it goes to Step 1207 (Step 1206). For other cases, it returns to Step 1204 and selects the column with the next priority for the same processing.

It is judged whether the article selected at Step 1201 can be strictly laid out to the column selected at Step 1204 (Step 1207). Whether the article can be laid out or not can be learned, for example, by actually supplying the selected article to the selected column according to the shape restriction data 131 of the article. The font size, character pitch and line intervals and other similar data used for such judgment are temporarily stored. If the article is judged that it can be laid out to the applicable column, the allocation section 106 proceeds to Step 1208. When it is impossible to lay out the article in the applicable column, it returns to Step 1204 and selects the next priority column for the same processing.

Then, the article selected at Step 1201 is allocated to the column selected at Step 1204 (Step 1208). The article selected at Step 1201 and the column selected at Step 1204 are, as already allocated alternatives, deleted from the candidates to be selected at Steps 1201 and 1204. The article number of the article selected at Step 1201, the column number of the column selected at Step 1204 and the font size, character pitch, line intervals and other similar data determined at Step 1207 are associated and added to the layout result 133.

Referring to the column layout order read out from the layout data group storage 105, the allocation section 106 judges whether there is any column which does not have any article allocated yet (Step 1209). If there is no such column, the allocation section 106 proceeds to Step 1202. On the other hand, if it finds a column without any article allocated, it returns to Step 1201 and selects the article with the next priority for the same processing.

Finally, the obtained layout result 133 is supplied to the layout data group storage 105 and the layout result evaluation section 107 and the procedure is terminated (Step 1202).

The evaluation processing of the layout result 133 by the layout result evaluation section 107 is now described. The layout result evaluation section 107 has the layout result 133 input from the allocation section 106 and generates the evaluation value 127 as a numerically expressed evaluation of the layout result 133 and stores it to the layout data group storage 105. The article layout device of this embodiment can be considered as a device to retrieve a layout with a higher evaluation value 127. There are many possible criteria or standards for evaluation of the layout result 133. Note that, however, this device can be used regardless of the standard adopted. For easier understanding, the processing as evaluation of the layout result 133 will be described below referring to FIGS. 13 and 14.

Figures 13, 14:
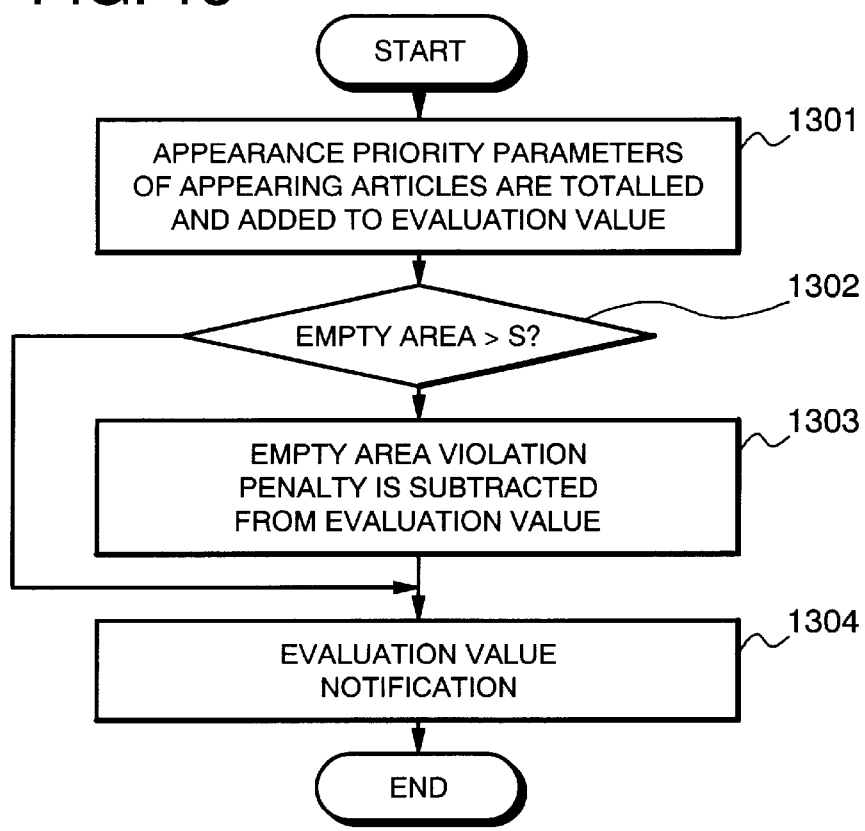
FIG. 13 is a flowchart to illustrate the operation of the layout result evaluation section according to the first embodiment.
FIG. 14 is a table to show the relation between the article numbers and the appearance priorities.

FIG. 13 is a flowchart illustrating the control flow of the layout result evaluation section 107 according to the first embodiment. FIG. 14 is a diagram to show the relation between the article numbers and the appearance priorities.

Suppose here that a data 361 called the appearance priority (See FIG. 1) as shown in FIG. 14 can be obtained from the article input section 111 for the articles. For example, the article of the article number "1" has the appearance priority "10", and the article of the article number "2" has the appearance priority "20". In this operation example, the layout result is evaluated according to the following standards including the appearance priority.

Standard 1: The total of the appearance priorities for the articles included in a limited article space shall be as high as possible.

Standard 2: The empty area in the article space shall not be more than a certain area.

Standard 2 is provided to prevent any large empty space from being generated on a particular page by balancing the article amount among the pages when there are some empty areas even after laying out all articles to a plurality of article spaces.

As shown in FIG. 13, the layout result evaluation section 107 totals the appearance priorities of the appearing articles according to the layout result data 133 input from the allocation section 106 and the appearance priority data 361 of the articles input from the article input section 111 and adds such total to the evaluation value (Step 1301). Note that various determination methods may be possible to determine the appearance priority corresponding to the possible range of the appearance priority, and one of them may be specified in advance. For example, square root sum or product may be used instead of the appearance priority total. The initial evaluation value may be usually "0", but it can have a positive initial value in preparation for the subtraction at Step 1303 so that the value can be always maintained to be positive.

Next, according to the layout result data 133 input from the allocation section 106, the ratio which the sum of the areas without any article laid out and not in use as spacers between articles in the article space (i.e. empty area) represents in the whole article space area is determined for each article space and compared with the predetermined threshold "S" (Step 1302). When the empty area is larger, the processing proceeds to Step 1303. For other cases, the processing proceeds to Step 1304.

When the empty area rate is larger than the threshold "S", the threshold "S" is subtracted from the evaluation value as the empty area violation penalty (Step 1303). Finally, the layout result evaluation data (evaluation value) 127 is sent to the layout data group storage section 105 (Step 1304). Alternatively, the subtraction upon empty area violation may not be executed upon comparison with the predetermined threshold "S", but may be executed by determining the subtraction amount according to the ratio of the empty area to the whole article space.

Then, the layout source data synthesis processing will be described below.

Figure 15:
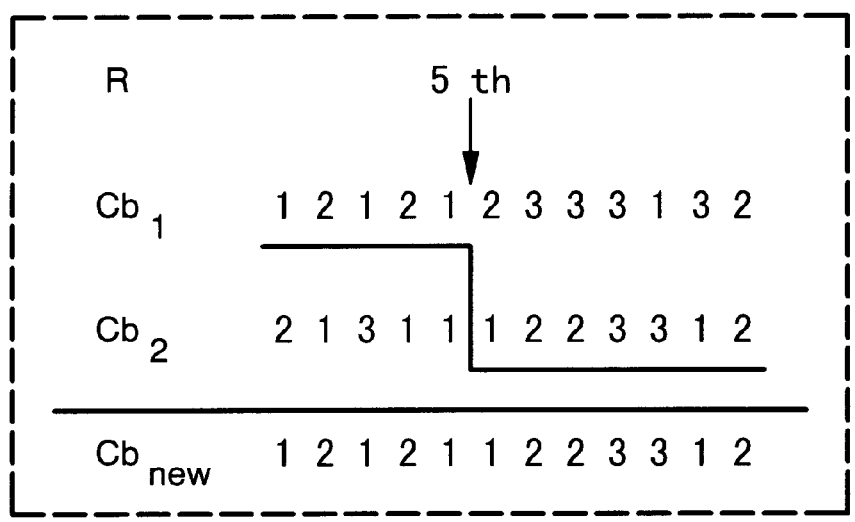
FIG. 15 is an explanatory view illustrating the synthesis of the layout source data by one point crossing.
Figure 16:
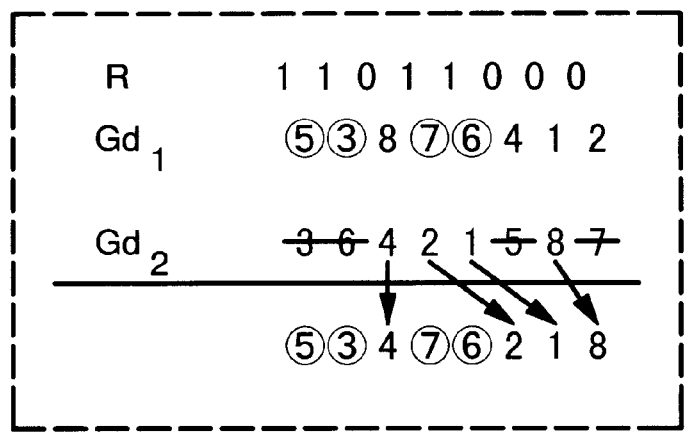
FIG. 16 is an explanatory view illustrating the operation to synthesize the processing order for a new column layout processing from the two column layout processing orders corresponding to FIGS. 8 and 9.

FIG. 15 illustrates the synthesis of the layout source data by one-point crossing. Synthesis of the column combination number string as a part of the column shape data 124 is taken as an example. FIG. 16 illustrates the synthesis of the layout source data by order crossing. Taken as an example is the synthesis of column layout priorities. The layout order is expressed as the column number string with the same order as the column layout order. In FIG. 15, according to the two column combination number strings Cb(1) and Cb(2) corresponding to FIGS. 4 and 6 respectively, a new column combination number string Cb(new) is synthesized. The reference alphabet R represents a random number. In FIG. 16, according to the processing orders Gd(1) and Gd(2), which are two column layout orders corresponding to FIGS. 8 and 9 respectively and expressed by the column number string laid in the order of layout processing, a new column layout processing order Gd(new) is synthesized.

The layout source data synthesis section 109 uses the evaluation values read out from the layout data group storage 105 to determine the ratio of the evaluation values to the sum of all evaluation values. Then, according to the rate of the evaluation values as the determination result and a random number read out from the random number generation section 104, it selects a set of layout source data (column shape data with column layout order 124 and article layout order). Then, it synthesizes a new layout source data according to the selected layout source data and the random number read out from the random generation section 104 and stores it to the layout data group storage 105.

Specifically, the layout source data synthesis section 109 firstly reads out the evaluation values from the layout data group storage 105 and, for each evaluation value Pi, determines the sum of the evaluation values accumulated so far and that evaluation value SPi as follows: SPi=SPi−1+Pi (i=1: the number of layout data), where SP0=0. It also reads out two random numbers R in the range from "1" to the sum of all evaluation values from the random number generation section 104. It retrieves SPi with which the following formula is true for the read out random numbers R:

$$SPi-1 < R <= SPi$$

Then, it selects the layout source data corresponding to the retrieved SPi (Layout source data No. i). Since the retrieval is made for two random numbers, it reads out two layout source data from the layout data group storage 105.

Then, for the column shape data with column layout order 124, the number of columns and the coordinate, the starting column and the ending column to define divisional lines are synthesized as follows.

Method 1: A new column count is synthesized by averaging two column counts. The coordinate, the starting column and the ending column are also synthesized similarly.

Method 2: Either of the two column counts is selected according to the random number obtained from the random number generation section 104. The coordinate and the starting column and the ending column are also selected in the same way. Method 2 enables synthesis of combination with new divisional lines or of new column count and divisional lines. These two methods may be randomly selected according to the random number obtained from the random number generation section 104.

Then, the column combination number string contained in the column shape data with column layout order 124 is synthesized as follows.

Two column combination number strings are selected as the base first. Then, a random number in the range from "1" to "(the number of column combination numbers contained in the column combination number string)−1" is read out from the random number generation section 104 and the column combination number string is divided into two sections at the position of the read out random number. A new column combination number string is synthesized by combining the divided column combination number strings.

Referring to FIG. 15, which shows an example, the two selected column combination number strings are Cb(1) "1, 2, 1, 2, 1, 2, 3, 3, 3, 1, 3, 2" and Cb(2) "2, 1, 3, 1, 1, 1, 2, 2, 3, 3, 1, 2" and the random number read out from the random number generation section 104 is "5". The column combination number string is divided at the fifth number from the left. Specifically, Cb(1) is divided into "1, 2, 1, 2, 1" and "2, 3, 3, 3, 1, 3, 2" and Cb(2) into "2, 1, 3, 1, 1" and "1, 2, 2, 3, 3, 1, 2". By combining the first half of Cb(1) and the latter half of Cb(2), a new column combination number string Cb (new) "1, 2, 1, 2, 1, 1, 2, 2, 3, 3, 1, 2" is synthesized.

Next, the column layout order to be contained in the column shape data with column layout order 124 is synthesized as follows:

Two column combination number strings are firstly selected as the base, and then a binary random number having the same number of digits as the maximum column layout order is read out from the random number generation section 104. Next, the column numbers corresponding to the digits having "1" in the read out binary random number are copied from one of the column layout order to a new column layout order at the same positions. Then, the remaining positions are filled with the remaining column numbers so that their order becomes the same as that in the other column layout order.

Referring to FIG. 16, for example, the column number strings of the two selected column layout orders are Gd(1) "5, 3, 8, 7, 6, 4, 1, 2" and Gd(2) "3, 6, 4, 2, 1, 5, 8, 7", and the random number R read out from the random number generation section 104 is "11011000". According to the random number R, the first, second, fourth and fifth numbers from Gd(1) are copied to a new column layout order. At this moment, the new column layout order becomes "5, 3, ?, 7, 6, ?, ?, ?", where "?" indicates the number not defined yet. Then, the column numbers other than "5, 3, 7, and 6" are extracted from Gd(2). The extracted column number string is "4, 2, 1, 8". This is used to fill the undefined positions in the new column layout order. Thus, the new column layout order Gd(new) "5, 3, 4, 7, 6, 2, 1, 8" can be obtained.

Then, the article layout order is synthesized according to the same procedure as for the column layout order. Finally, all of the newly synthesized layout source data are stored to the layout data group storage 105.

Next, the operation of the entire article layout device will be described below.

Figure 17:
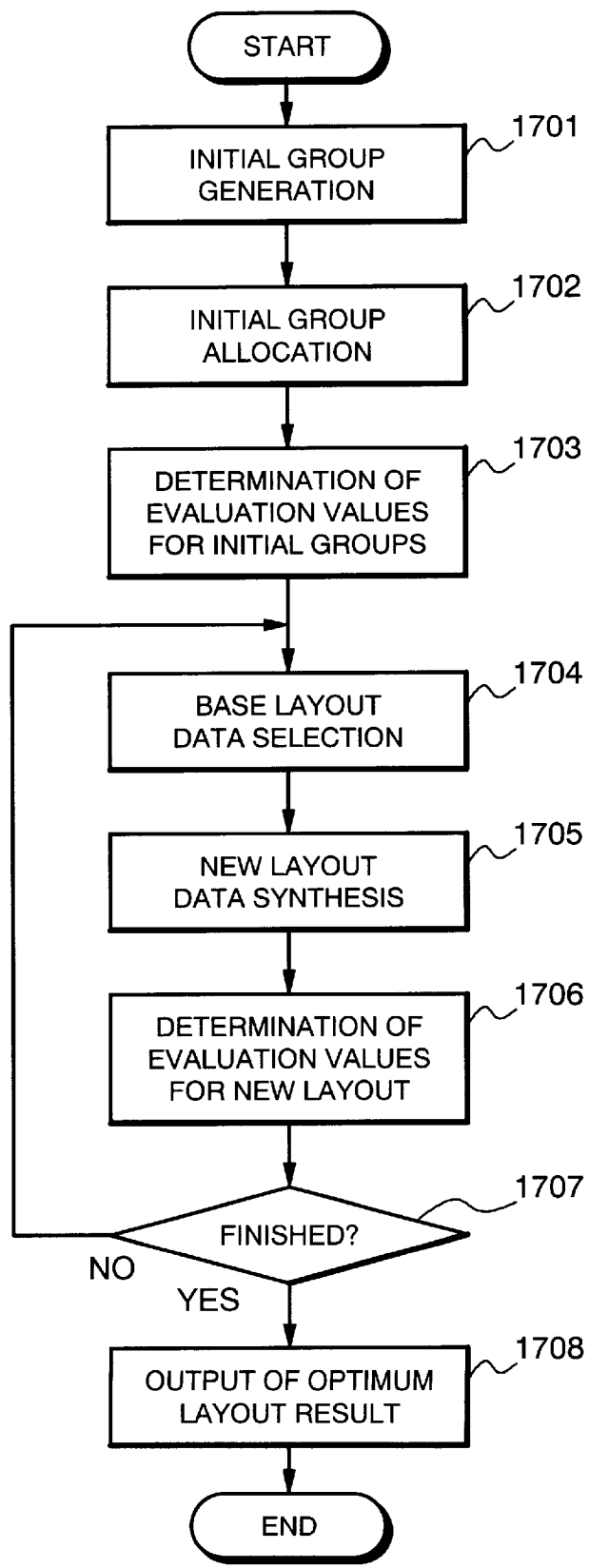
FIG. 17 is a flowchart to illustrate the operation of the entire article layout device according to the first embodiment.

FIG. 17 is a flowchart illustrating the operation of the entire article layout device according to the first embodiment.

The column shape data generation section 101 firstly reads out a random number from the random number generation section 104 and generates the column shape data using the read out random number and supplies such data to the column layout order generation section 102. The column layout order generation section 102 adds the layout order for the columns generated with the random number read out from the random number generation section 104 to the column shape data input from the column shape data generation section 101, so as to generate the column shape data with the column layout order. The article layout order generation section 103 generates the layout order for the articles using the random number read out from the random number generation section 104. Thus, the predetermined number of layout source data are generated and stored to the layout data group storage 105 (Step 1701).

The allocation section 106 reads out the layout source data stored in the layout data group storage 105 one by one and has the article shape restriction data input from the article shape restriction data output section 108 and, according to such data, allocates the articles to the columns where they can be laid out. Then, it outputs the layout result to the layout data group storage 105 and the layout result evaluation section 107. The layout data group storage 105 associates the layout source data with the corresponding layout results for storage (Step 1702).

The layout result evaluation section 107 calculates the evaluation value of the layout result for all layout results processed by the allocation section 106 and stores the calculated evaluation values to the layout data group storage 105. The layout data group storage 105 stores the layout source data as associated with the corresponding evaluation values (Step 1703).

The layout source data synthesis section 109 uses the ratio of the evaluation values to the sum of all evaluation values calculated with the evaluation values read out from the layout data group storage 105 as well as the random number read out from the random number generation section 104 to select a single layout source data (Step 1704). Then, using the selected layout source data and a random number read out from the random number generation section 104, it synthesizes a new layout source data (Step 1705). In addition, it has the newly synthesized layout source data stored to the layout data group storage 105.

The allocation section 106 reads out the article shape restriction data from the article shape restriction data output section 108 and, using a new layout source data, allocates the articles again to the columns where they can be laid out. Then, it supplies the layout result to the layout data group storage 105 and the layout result evaluation section 107. The layout data group storage 105 associates the new layout source data with the layout result for storage (Step 1705).

The layout result evaluation section 107 calculates the evaluation value of the layout result for the new layout result determined at Step 1705 and stores such evaluation value to the layout data group storage 105. The layout data group storage 105 associates the new layout source data with the evaluation values for storage (Step 1706).

Then, it is judged whether the termination condition as described below is satisfied or not (Step 1707). If not, the device returns to Step 1704 to repeat the procedure. If it is satisfied, it proceeds to Step 1708.

As the termination condition, the following conditions can be considered. These conditions may be arbitrarily combined.

Condition 1: Whether the number of new layout source data syntheses exceeds the predetermined number.

Condition 2: Whether the processing time from the start of Step 1701 exceeds the predetermined time Condition 3: Whether the maximum evaluation value stored in the layout data group storage 105 exceeds the predetermined number.

Condition 4: Whether the maximum evaluation value stored in the layout data group storage 105 is not updated for more than the predetermined times Condition 5: Whether the maximum evaluation value stored in the layout data group storage 105 is not updated for more than the predetermined period of time Finally, the optimum layout retrieval section 110 retrieves the maximum evaluation value from the layout data group storage 105 and outputs the layout result corresponding to such evaluation value to the article output section 112 (Step 1708). The article output section 112 displays the articles on the screen or prints them out on paper according to the layout result input from the optimum layout retrieval section 110 and the contents (document component data) of the articles input from the article input section 111.

<Second Embodiment>

Figure 18:
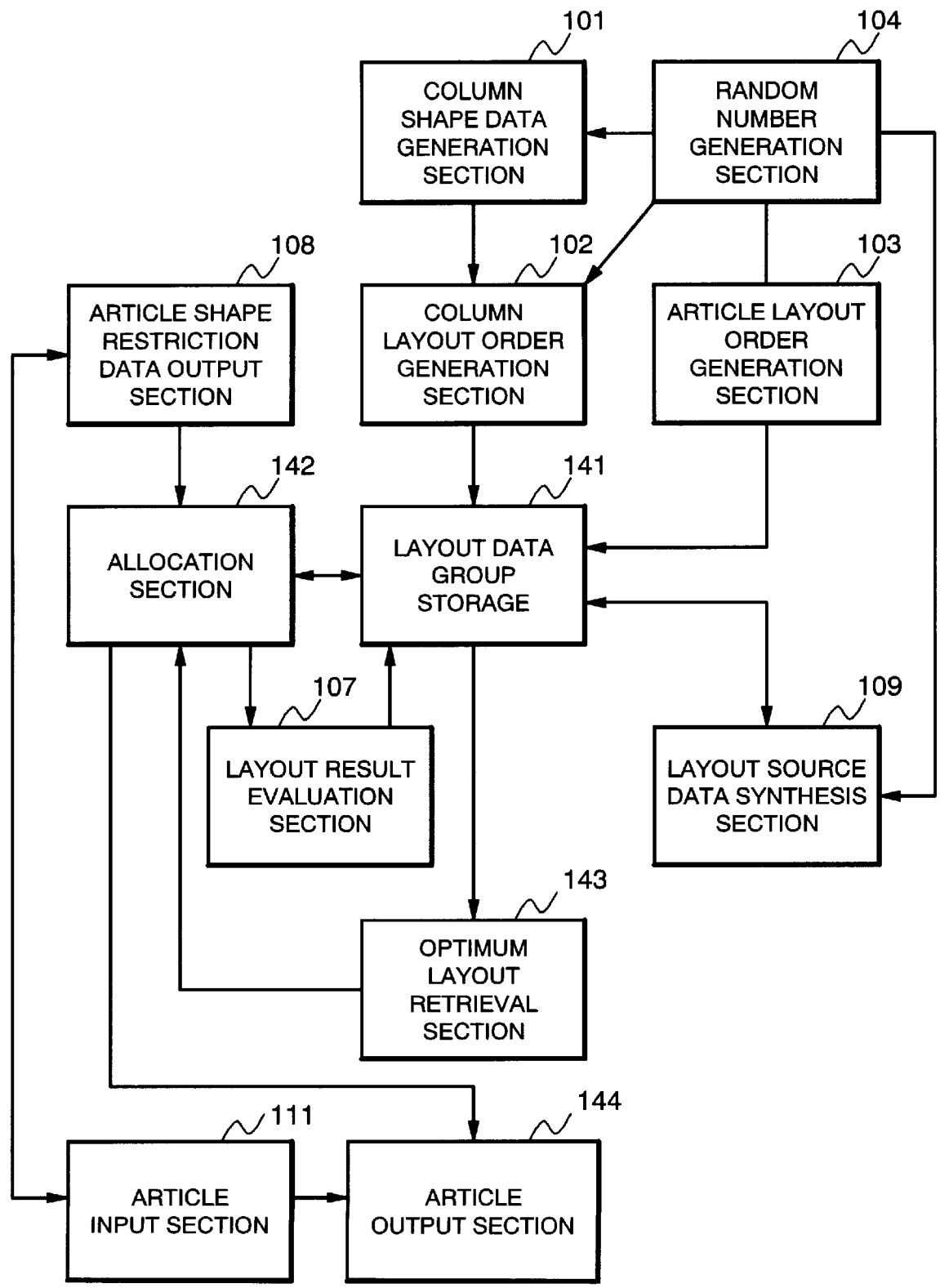
FIG. 18 is a block diagram to show the configuration of an article layout device according to a second embodiment of the present invention.

FIG. 18 is a block diagram to show the configuration of an article layout device according to a second embodiment of the present invention.

As shown in the figure, an article layout device according to this embodiment comprises a column shape data generation section 101, a column layout order generation section 102, an article layout order generation section 103, a random number generation section 104, a layout data group storage 141, an allocation section 142, a layout result evaluation section 107, an article shape restriction data output section 108, a layout source data synthesis section 109, an optimum layout retrieval section 143, an article input section 111 and an article output section 144. Note that FIG. 18 just shows the characteristic components of this embodiment, with omitting other general components.

In the above configuration, the column shape data generation section 101, the column layout order generation section 102, the article layout order generation section 103, the random number generation section 104, the layout result evaluation section 107, the article shape restriction data output section 108, the layout source data synthesis section 109, and the article input section 111 have the same function as in the first embodiment of FIG. 1. They are given the same reference numerals and the description for them is omitted. The allocation section 142 and the optimum layout retrieval section 143 are, for example, achieved by a CPU (Central Processing Unit) under control by the computer program stored in a RAM or other internal memories or magnetic disks or other external storage devices. The layout data group storage 141 is achieved by a RAM or other internal memories or magnetic disks or other external storage devices. The article output section 144 is achieved by a printer or a CRT display.

The layout data group storage 141 stores the predetermined number of layout data. A layout data here includes a column shape data with column layout order, an article layout order and an evaluation value. The column shape data with column layout order is input from the column layout order generation section 102, the article layout order from the article layout order generation section 103, and the evaluation value from the layout result evaluation section 107.

The layout data group storage 141 has, at a certain step of processing, the column shape data with column layout order and the article layout order read out by the allocation section 142, has the column shape data with column layout order and the article layout order read out by the layout source data synthesis section 109 and has the evaluation value and the column shape data with column layout order and the article layout order read out by the optimum layout retrieval section 143.

The allocation section 142 reads out the layout source data from the layout data group storage 141, and the article shape restriction data from the article shape restriction data output section 108 and, according to these data, allocates the articles to the columns where they can be laid out. It outputs the layout result to the layout result evaluation section 107. It also has the layout source data with the optimum evaluation value input from the optimum layout retrieval section 143 and allocates the articles to the columns where they can be laid out for layout processing and outputs the layout result to the article output section 144.

The optimum layout retrieval section 143 retrieves the maximum evaluation value from the layout data group storage 141, reads out the layout source data corresponding to the retrieved evaluation value and outputs it to the allocation section 142.

The article output section 144 has the layout result input from the allocation section 142 and has the article contents (document component data) input from the article input section 111 and, according to the layout result, displays the articles on the screen or print them out on paper.

Figure 19:
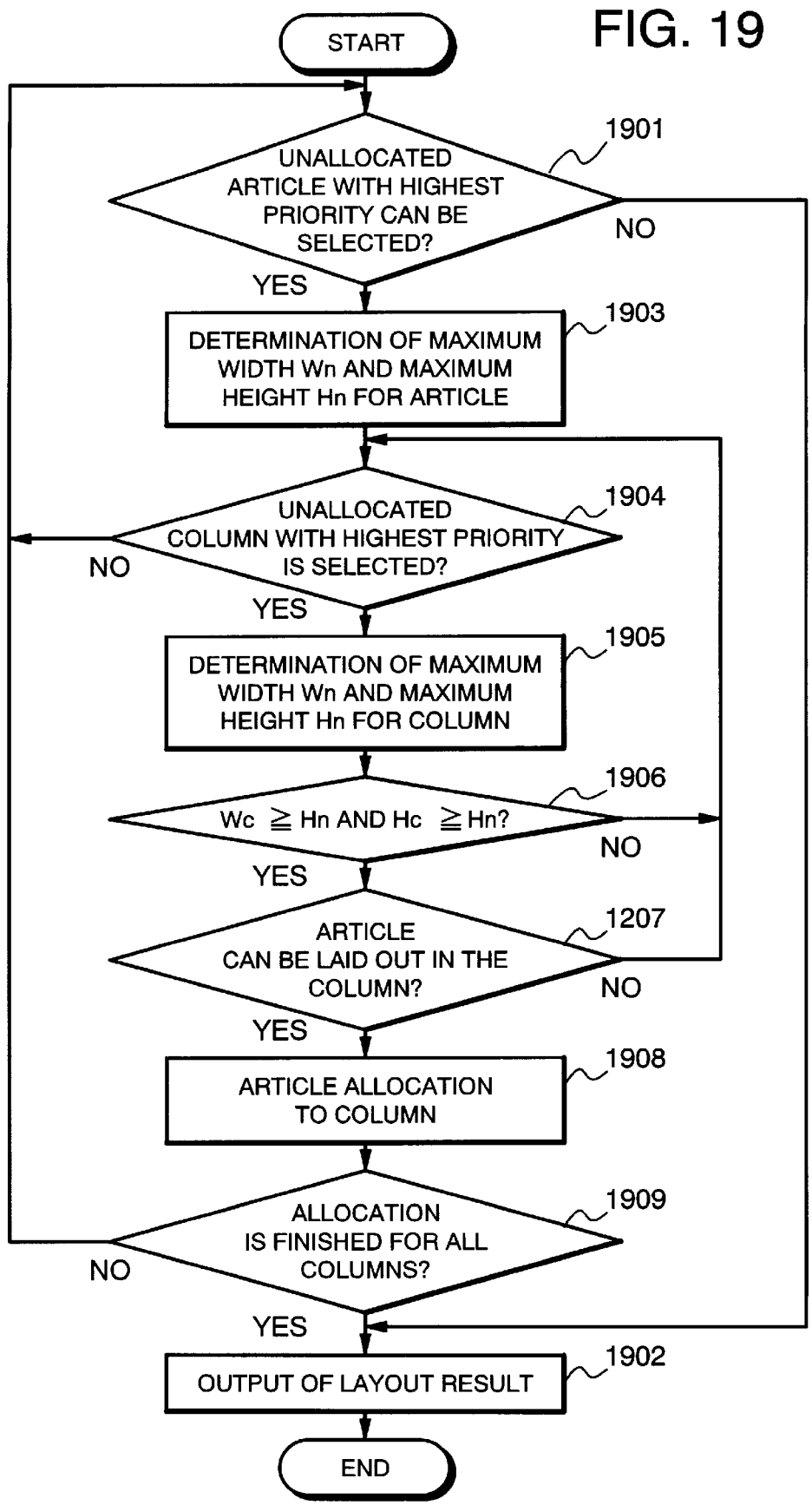
FIG. 19 is a flowchart to illustrate the operation of the allocation section according to the second embodiment.
Figure 20:
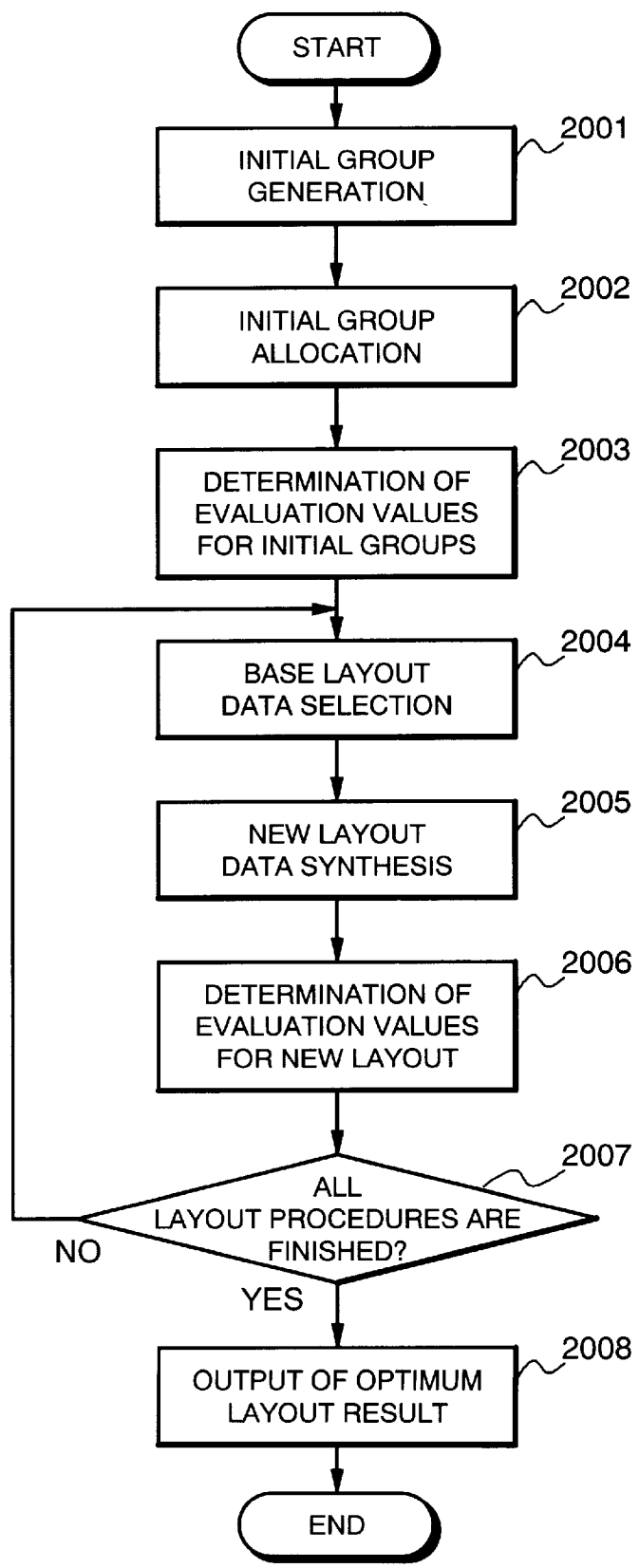
FIG. 20 is a flowchart to illustrate the operation of the entire article layout device according to the second embodiment.
Figure 21:
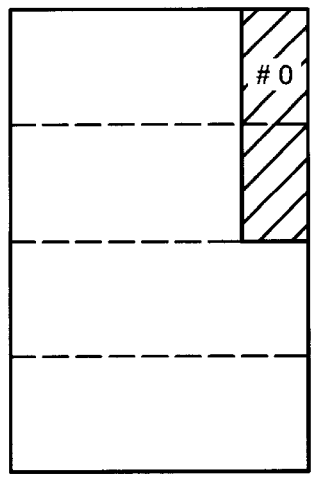
FIG. 21 is a diagram to show the first step of the article layout processing according to the first conventional method.
Figure 22:
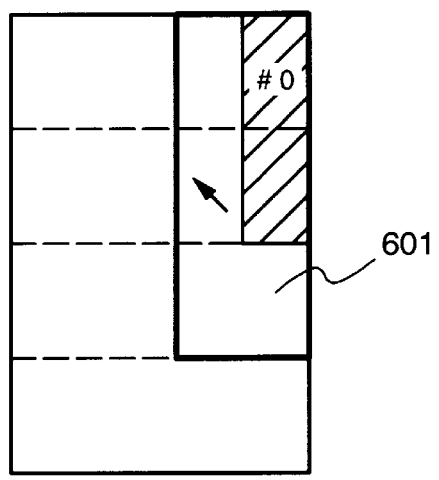
FIG. 22 is a diagram to show the first step of the article layout processing to the first area according to the first conventional method.
Figure 23:
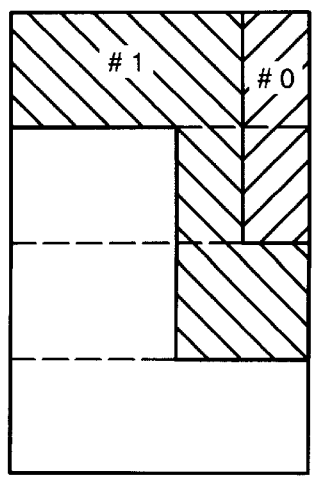
FIG. 23 is a diagram to show the second step of the article layout processing to the first area according to the first conventional method.
Figure 24:
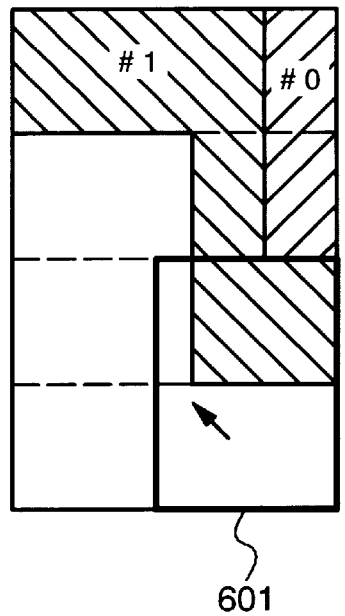
FIG. 24 is a diagram to show the first step of the article layout processing to the second area according to the first conventional method.
Figure 25:
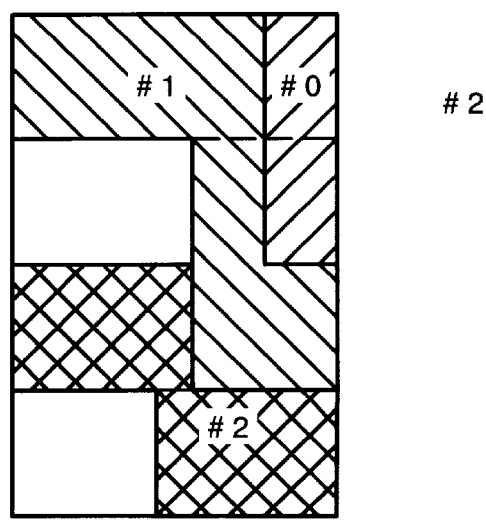
FIG. 25 is a diagram to show the second step of the article layout processing to the second area according to the first conventional method.
Figure 26:
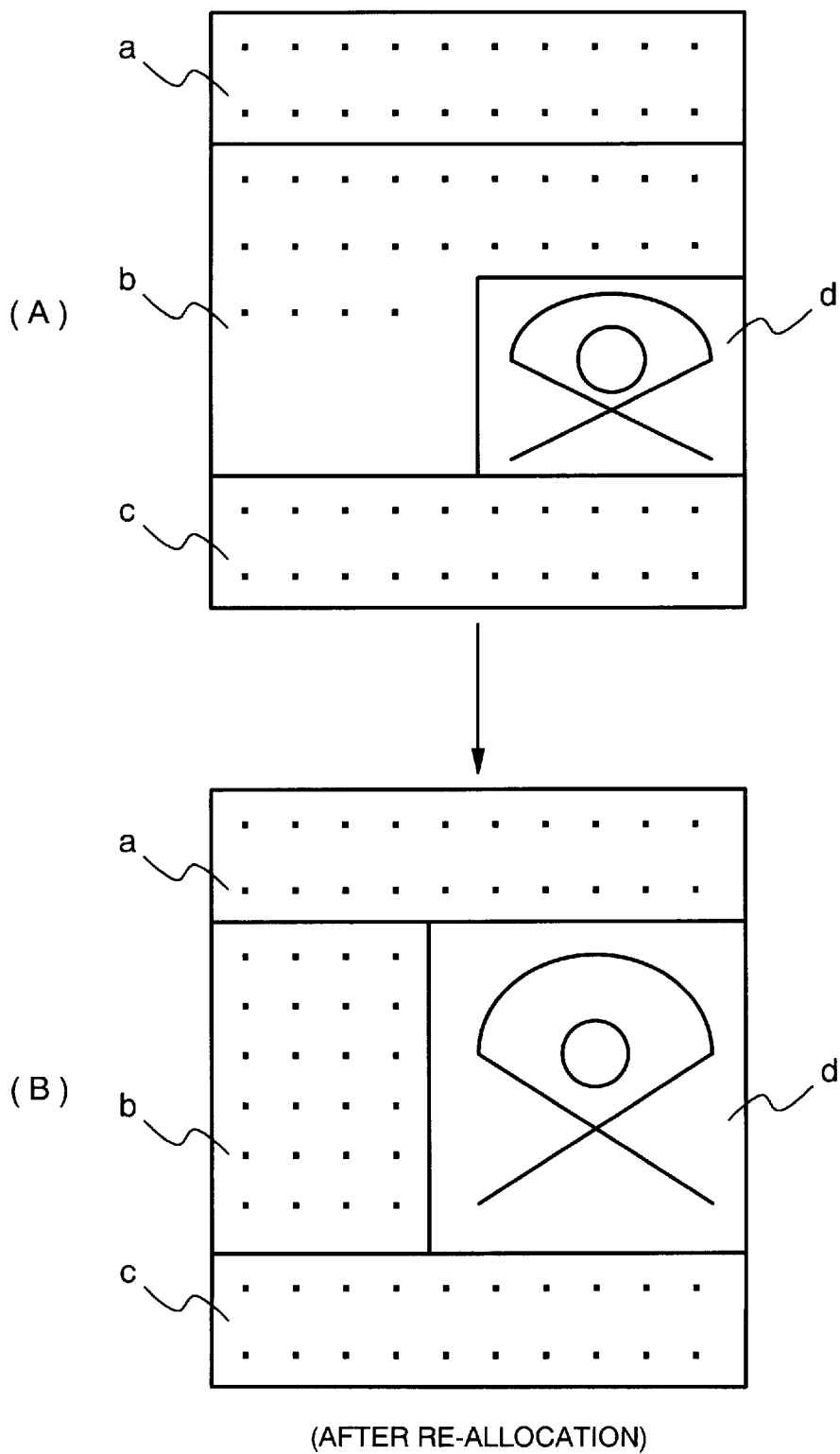
FIG. 26 is an explanatory view to illustrate the article layout processing according to the second conventional method.
Figure 27:
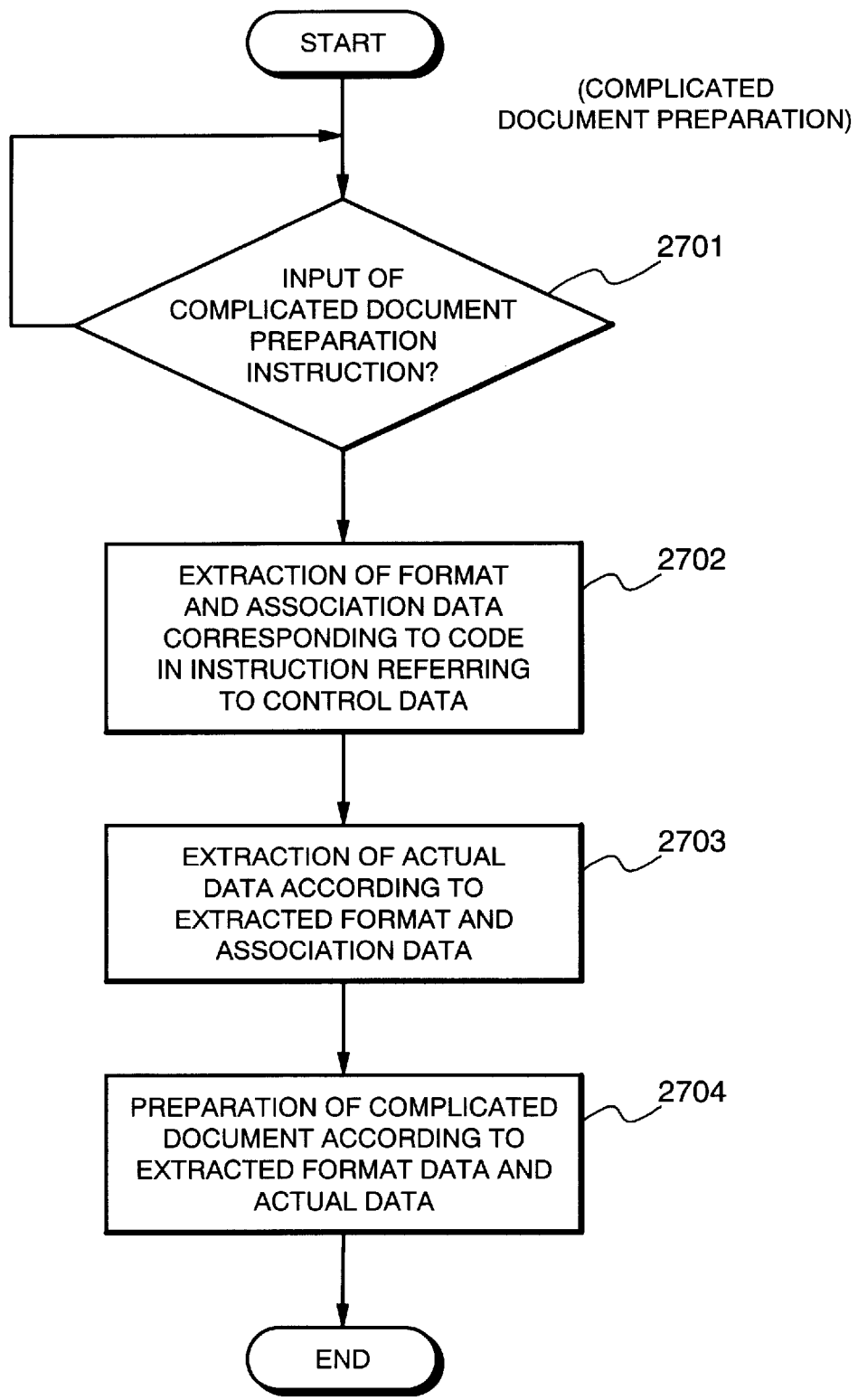
FIG. 27 is a flowchart to illustrate the flow of the article layout processing according to the third conventional method.
Figure 28:
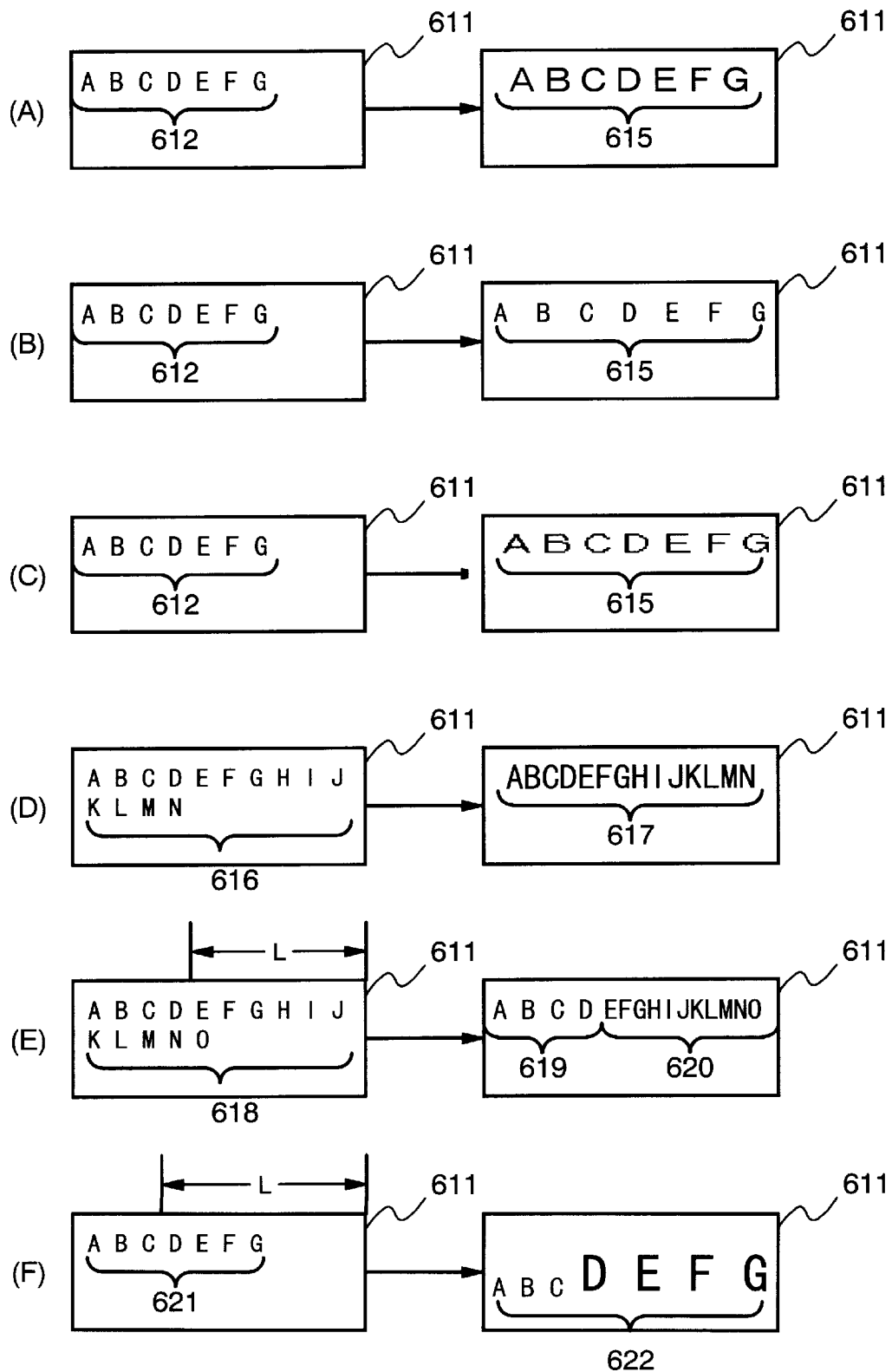
FIG. 28 is an explanatory view to illustrate the article layout processing according to the fourth conventional method.

Next, referring to the block diagram of FIG. 18 and the flowcharts of FIGS. 19 and 20, the operation of the device according to the second embodiment will be described below. Firstly, the allocation processing by the allocation section 142 will be described with referring to the flowchart of FIG. 19.

The allocation section 142 firstly refers to the article layout order read out from the layout data group storage 105 or the article layout order input from the optimum layout retrieval section 143 and checks whether the article with the highest layout priority among the articles not yet allocated to any column can be selected as the processing subject (Step 1901). If there is no article to be selected, it outputs the layout result and terminates the procedure (Step 1902).

If the article with the highest layout priority can be selected as the processing subject at Step 1901, the shape restriction data corresponding to the selected article is read out from the article shape restriction data output section 108 so that the maximum width Wn and the maximum height Hn for the article can be calculated (Step 1903). Then, the allocation section 142 refers to the column layout order read out from the layout data group storage 105 or the column layout order input from the optimum layout retrieval section 143, and selects, as the processing subject, the column with the highest layout priority among those which the processing from Step 1905 has not been executed for and has no article allocated (Step 1904). If there is no column to be selected here, it returns to Step 1201 and selects the article with the second highest priority for the same processing.

If there is a column to be selected as the subject of article allocation, the processing from Step 1905 is executed. The processing from Step 1905 is the same as that from Step 1205 for allocation by the allocation section 106 according to the first embodiment as shown in FIG. 12 and the description about it is omitted.

Finally, the obtained layout result 133 is supplied to the layout result evaluation section 107 and the processing is terminated (Step 1902).

Referring now to the flowchart of FIG. 20, the operation of the entire article layout device according to the second embodiment will be described below.

As in the first embodiment, the column shape data generation section 101, the column layout order generation section 102 and the article layout order generation section 103 generate the predetermined number of layout source data and store them to the layout data group storage 141 (Step 2001).

The allocation section 142 reads out the layout source data stored in the layout data group storage 141 one by one and has the article shape restriction data input from the article shape restriction data output section 108 and, according to these data, allocates the articles to the columns where they can be laid out. Then, it outputs the layout result to the layout result evaluation section 107 (Step 2002).

The operations of the layout source data evaluation (Step 2003) and the selection of the base layout source data (Step 2004) are the same as those of Steps 1703 and 1704 in the first embodiment as shown in FIG. 17.

The layout source data synthesis section 109 uses the layout source data selected at Step 2004 and a random number read out from the random number generation section 104 to synthesize a new layout source data and stores such new layout source data to the layout data group storage 141 (Step 2005). The allocation section 142 has the article shape restriction data input from the article shape restriction data output section 108 and allocates the articles to the columns where they can be laid out using the new layout source data read out from the layout data group storage 141 and outputs the layout result to the layout result evaluation section 107.

The operations of the layout result evaluation (Step 2006) and the termination condition judgment (Step 2007) by the layout result evaluation section 107 are the same as those of Steps 1706 and 1707 in the first embodiment as shown in FIG. 17.

Finally, the optimum layout retrieval section 143 retrieves the maximum evaluation value from the layout data group storage 141, reads out the layout source data corresponding to the evaluation value and supplies it to the allocation section 142. The article output section 144 displays the articles on the screen or prints them out on paper according to the layout result input from the allocation section 142 and the article contents (document component data) input from the article input section 111 (Step 2008).

Unlike the device of the first embodiment, the layout data group storage 141 in the second embodiment as described above does not store the layout results. For this reason, the layout data group storage 141 in the second embodiment is advantageous in that it causes a smaller consumption of the memory capacity than the layout data group storage 105 in the first embodiment. On the other hand, since the layout data group storage 141 does not store the layout results, it is necessary to calculate the layout result again using the allocation section 142 to output the optimum layout result. However, the processing time required for recalculation can be ignored when considering the total processing time. This does not cause any problem such as lower processing speed for the entire system.

In a variation example of this invention as shown in FIG. 2, the divisional lines may not be expressed with the starting and ending columns given as the number of columns, but may be expressed with the coordinates in relation to the coordinate axes set on the article space so that they can be stored in the layout data group storage and converted into the number of columns at the allocation section. Thus, it is possible to execute more appropriate synthesis of the layout source data even for the layout source having different number of columns.

In another variation example, the column generation means may combine unit areas using the column combination numbers normalized in ascending or descending order according to the order of appearance. In this way, the column shape data for a column shape can be uniquely specified.

For example, to obtain the columns as shown in FIG. 7, not only the column combination number string "2, 1, 3, 1, 1, 1, 2, 2, 3, 3, 1, 2" as shown in FIG. 6, but also other column combination number strings such as "1, 2, 3, 2, 2, 2, 1, 1, 3, 3, 2, 1" may be used. This column combination number string is in ascending order according to the order of appearance. Such variety may cause the device to consider the same layout as a different one, which results in that the evaluation value for the same layout is distributed to several layouts, and the applicable layout result may be improperly provided with a small evaluation number. This problem can be solved by normalization for unique orders such as ascending or descending order.

As described above, an article layout device of the present invention achieves the following effects.

Firstly, by automatically generating many layout results and evaluating them, the device can automatically select the optimum layout result and can achieve a good layout without any human intervention. Thus, the procedure from article acquisition to printing can be automated and the labor required for this work can be largely saved.

Secondly, the generated columns are a group of several columns having a rectangular shape and can have a complicated shape. This enables trial for complicated combination of the articles. Thus, it is expected that the article space can be effectively utilized.

Thirdly, this article layout device can synthesize the layout source data, which serves as an essential point when adapting the so-called gene algorithm to it. This is because the data as the base of the article layout variations are made into parameters as follows. Note that the gene algorithm is an algorithm to seek for a nearly optimal solution modeled on the adaptive evolution mechanism of the creatures. The layout source data can be compared to the gene and the synthesis of the layout source data can be compared to the crossbreeding.

In the first parameter method, the number of columns, the number of divisional pages, the divisional lines expressed with coordinates and the starting and ending columns and the column combination numbers can be used as the column shape data.

In the second parameter method, the column layout order and the article layout order can be used as the source data for layout trials.

By thus making the data into parameters, the synthesized parameters can be used as the layout source data.

Fourthly, since the base layout source data is selected so that better layout results can be obtained with a higher probability in the synthesis of the layout source data, the probability to synthesize layout data which highly possibly generates good layout results becomes higher. For this reason, compared with random generation of many layout source data, it is highly possible that a good layout is obtained even when only a few layout data are studied with this device. This device thus enables to acquire good layout results at a high speed and to improve the processing efficiency.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An article layout device for layout of document on which a plurality of article data with some columns are laid out comprising:

an article data input means for inputting said article data;

a column generation means for dividing the article space to lay out said article data into a plurality of columns with random shapes;

a column layout order generation means for providing the columns generated by said column generation means with the order of layout processing;

an article layout order generation means for providing said article data with the order of layout processing;

a layout source data synthesis means for synthesizing a new division result of said article space by combining a plurality of division results of the article space divided into some columns by said column generation means, synthesizing a new layout order of said columns by combining a plurality of layout orders for said columns generated by said column layout order generation means and also synthesizing a new layout order of said article data by combining a plurality of layout orders for said article data generated by said article layout order generation means;

an allocation means for allocating said article data to said columns according to the layout order for said columns determined by said column layout order generation means or the column layout order for said columns synthesized by said layout source data synthesis means and the layout order for said article data determined by said article layout order generation means or the layout order for said article data synthesized by said layout source data synthesis means;

a layout result evaluation means for evaluating the layout results output from said allocation means and generating the evaluation values;

an optimum layout result retrieval means, according to the evaluation values generated by said layout result evaluation means, for detecting the layout result with the maximum evaluation value from the layout results output from said allocation means; and an article output means, according to the layout result detected by said optimum layout result retrieval means, for laying out said article data on said article space for output.

2. An article layout device as set forth in claim 1, wherein said column generation means
  divides said article space into a plurality of columns,
  generates unit areas by further dividing said plurality of columns,
  provides said unit areas with the column combination number and
  generates columns by combining said unit areas having the same column number among said unit areas mutually neighboring for either side.

3. An article layout device as set forth in claim 1, wherein said layout source data synthesis means selects, when synthesizing a new layout order for said columns and a new layout order for said article data in relation to the division result for a new article space, a set serving as a synthesis base for a higher probability in that the set with a high evaluation value generated by said layout result evaluation means is selected from the sets of the existing space division result, the existing column layout order and the existing article data layout order.

4. An article layout device as set forth in claim 1, wherein said layout source data synthesis means repeatedly synthesizes new division results for the article space by combining a plurality of division results for the article space divided into some columns by said column generation means or division results for said article space synthesized by itself, and repeatedly synthesizes new layout orders for said columns by combining a plurality of layout orders for said columns generated by said column layout order generation means or layout orders for said columns synthesized by itself, and repeatedly synthesizes new layout orders for said article data by combining a plurality of layout orders for said article data generated by said article layout order generation means or layout orders for said article data synthesized by itself.

5. An article layout device as set forth in claim 1, wherein said layout source data synthesis means repeatedly synthesizes new division results for the article space by combining a plurality of division results for the article space divided into some columns by said column generation means or division results for said article space synthesized by itself, and repeatedly synthesizes new layout orders for said columns by combining a plurality of layout orders for said columns generated by said column layout order generation means or layout orders for said columns synthesized by itself, and repeatedly synthesizes new layout orders for said article data by combining a plurality of layout orders for said article data generated by said article layout order generation means or layout orders for said article data synthesized by itself, and said optimum layout result retrieval means
  starts its operation on condition that said layout source data synthesis means synthesizes the division results for the article space, said column layout order and said article data layout order for the predetermined number.

6. An article layout device as set forth in claim 1, wherein said layout source data synthesis means repeatedly synthesizes new division results for the article space by combining a plurality of division results for the article space divided into some columns by said column generation means or division results for said article space synthesized by itself, and repeatedly synthesizes new layout orders for said columns by combining a plurality of layout orders for said columns generated by said column layout order generation means or layout orders for said columns synthesized by itself, and repeatedly synthesizes new layout orders for said article data by combining a plurality of layout orders for said article data generated by said article layout order generation means or layout orders for said article data synthesized by itself, and said optimum layout result retrieval means starts its operation on condition that said layout source data synthesis means executes its processing for the predetermined time.

7. An article layout device as set forth in claim 1, wherein said layout source data synthesis means repeatedly synthesizes new division results for the article space by combining a plurality of division results for the article space divided into some columns by said column generation means or division results for said article space synthesized by itself, and repeatedly synthesizes new layout orders for said columns by combining a plurality of layout orders for said columns generated by said column layout order generation means or layout orders for said columns synthesized by itself, and repeatedly synthesizes new layout orders for said article data by combining a plurality of layout orders for said article data generated by said article layout order generation means or layout orders for said article data synthesized by itself, and said optimum layout result retrieval means starts its operation on condition that said layout result evaluation means provides an evaluation value exceeding the predetermined evaluation value for said layout result.

8. An article layout device as set forth in claim 1, wherein said layout source data synthesis means repeatedly synthesizes new division results for the article space by combining a plurality of division results for the article space divided into some columns by said column generation means or division results for said article space synthesized by itself, and repeatedly synthesizes new layout orders for said columns by combining a plurality of layout orders for said columns generated by said column layout order generation means or layout orders for said columns synthesized by itself, and repeatedly synthesizes new layout orders for said article data by combining a plurality of layout orders for said article data generated by said article layout order generation means or layout orders for said article data synthesized by itself, and said optimum layout result retrieval means counts the processing where the evaluation value given by said layout result evaluation means for the set of newly synthesized division result for the article space, said column layout order and said article data layout order does not update the maximum evaluation value before that and starts its operation when the number of such processing exceeds the predetermined number.

9. An article layout device as set forth in claim 1, wherein said layout source data synthesis means repeatedly synthesizes new division results for the article space by combining a plurality of division results for the article space divided into some columns by said column generation means or division results for said article space synthesized by itself, and repeatedly synthesizes new layout orders for said columns by combining a plurality of layout orders for said columns generated by said column layout order generation means or layout orders for said columns synthesized by itself, and repeatedly synthesizes new layout orders for said article data by combining a plurality of layout orders for said article data generated by said article layout order generation means or layout orders for said article data synthesized by itself, and said optimum layout result retrieval means detects the processing where the evaluation value given by said layout result evaluation means for the set of newly synthesized division result for the article space, said column layout order and said article data layout order does not update the maximum evaluation value before that and, starts its operation on condition that the time of continued processing exceeds the predetermined processing time.

10. An article layout device as set forth in claim 1, wherein said column generation means normalizes the column combination numbers appearing for the first time so that the numbers are incremented by one in the same direction according to the appearance order.

11. An article layout device for layout of document on which a plurality of article data with some columns are laid out comprising:

an article data input means for inputting said article data;

a column generation means for dividing the article space to lay out said article data into a plurality of columns with random shapes;

a column layout order generation means for providing the columns generated by said column generation means with the order of layout processing;

an article layout order generation means for providing said article data with the order of layout processing;

a layout source data synthesis means for synthesizing a new division result of said article space by combining a plurality of division results of the article space divided into some columns by said column generation means, synthesizing a new layout order of said columns by combining a plurality of layout orders for said columns generated by said column layout order generation means and also synthesizing a new layout order of said article data by combining a plurality of layout orders for said article data generated by said article layout order generation means;

an allocation means for allocating said article data to said columns according to the layout order for said columns determined by said column layout order generation means or the column layout order for said columns synthesized by said layout source data synthesis means and the layout order for said article data determined by said article layout order generation means or the layout order for said article data synthesized by said layout source data synthesis means;

a layout result evaluation means for evaluating the layout results output from said allocation means and generating the evaluation values;

an optimum layout result retrieval means, according to the evaluation values generated by said layout result evaluation means, for detecting the set having the maximum evaluation value among those containing the article space division result generated by said column generation means and said column layout order generated by said column layout order generation means and said article data layout order generated by said article layout order generation means;

an optimum layout allocation means, according to the set of article space division result and said column layout order and said article data layout order detected by said optimum layout result retrieval means, for allocating said article data to said columns; and an article output means for laying out and outputting said article data on said article space according to the layout result output by said optimum layout allocation means.

12. An article layout device as set forth in claim 11, wherein said allocation means also serves as said optimum layout allocation means.

13. An article layout device as set forth in claim 11, wherein said column generation means divides said article space into a plurality of columns, generates unit areas by further dividing said plurality of columns, provides said unit areas with the column combination number and generates columns by combining said unit areas having the same column number among said unit areas mutually neighboring for either side.

14. An article layout device as set forth in claim 11, wherein said layout source data synthesis means selects, when synthesizing a new layout order for said columns and a new layout order for said article data in relation to the division result for a new article space, a set serving as a synthesis base for a higher probability in that the set with a high evaluation value generated by said layout result evaluation means is selected from the sets of the existing space division result, the existing column layout order and the existing article data layout order.

15. An article layout device as set forth in claim 11, wherein said layout source data synthesis means repeatedly synthesizes new division results for the article space by combining a plurality of division results for the article space divided into some columns by said column generation means or division results for said article space synthesized by itself, and repeatedly synthesizes new layout orders for said columns by combining a plurality of layout orders for said columns generated by said column layout order generation means or layout orders for said columns synthesized by itself, and repeatedly synthesizes new layout orders for said article data by combining a plurality of layout orders for said article data generated by said article layout order generation means or layout orders for said article data synthesized by itself.

16. An article layout device as set forth in claim 11 wherein said layout source data synthesis means repeatedly synthesizes new division results for the article space by combining a plurality of division results for the article space divided into some columns by said column generation means or division results for said article space synthesized by itself, and repeatedly synthesizes new layout orders for said columns by combining a plurality of layout orders for said columns generated by said column layout order generation means or layout orders for said columns synthesized by itself, and repeatedly synthesizes new layout orders for said article data by combining a plurality of layout orders for said article data generated by said article layout order generation means or layout orders for said article data synthesized by itself, and said optimum layout result retrieval means
starts its operation on condition that said layout source data synthesis means synthesizes the division results for the article space, said column layout order and said article data layout order for the predetermined number.

17. An article layout device as set forth in claim 11, wherein said layout source data synthesis means repeatedly synthesizes new division results for the article space by combining a plurality of division results for the article space divided into some columns by said column generation means or division results for said article space synthesized by itself, and repeatedly synthesizes new layout orders for said columns by combining a plurality of layout orders for said columns generated by said column layout order generation means or layout orders for said columns synthesized by itself, and repeatedly synthesizes new layout orders for said article data by combining a plurality of layout orders for said article data generated by said article layout order generation means or layout orders for said article data synthesized by itself, and said optimum layout result retrieval means starts its operation on condition that said layout source data synthesis means executes its processing for the predetermined time.

18. An article layout device as set forth in claim 11, wherein said layout source data synthesis means repeatedly synthesizes new division results for the article space by combining a plurality of division results for the article space divided into some columns by said column generation means or division results for said article space synthesized by itself, and repeatedly synthesizes new layout orders for said columns by combining a plurality of layout orders for said columns generated by said column layout order generation means or layout orders for said columns synthesized by itself, and repeatedly synthesizes new layout orders for said article data by combining a plurality of layout orders for said article data generated by said article layout order generation means or layout orders for said article data synthesized by itself, and said optimum layout result retrieval means starts its operation on condition that said layout result evaluation means provides an evaluation value exceeding the predetermined evaluation value for said layout result.

19. An article layout device as set forth in claim 11, wherein said layout source data synthesis means repeatedly synthesizes new division results for the article space by combining a plurality of division results for the article space divided into some columns by said column generation means or division results for said article space synthesized by itself, and repeatedly synthesizes new layout orders for said columns by combining a plurality of layout orders for said columns generated by said column layout order generation means or layout orders for said columns synthesized by itself, and repeatedly synthesizes new layout orders for said article data by combining a plurality of layout orders for said article data generated by said article layout order generation means or layout orders for said article data synthesized by itself, and said optimum layout result retrieval means counts the processing where the evaluation value given by said layout result evaluation means for the set of newly synthesized division result for the article space, said column layout order and said article data layout order does not update the maximum evaluation value before that and starts its operation when the number of such processing exceeds the predetermined number.

20. An article layout device as set forth in claim 11, wherein said layout source data synthesis means repeatedly synthesizes new division results for the article space by combining a plurality of division results for the article space divided into some columns by said column generation means or division results for said article space synthesized by itself, and repeatedly synthesizes new layout orders for said columns by combining a plurality of layout orders for said columns generated by said column layout order generation means or layout orders for said columns synthesized by itself, and repeatedly synthesizes new layout orders for said article data by combining a plurality of layout orders for said article data generated by said article layout order generation means or layout orders for said article data synthesized by itself, and said optimum layout result retrieval means detects the processing where the evaluation value given by said layout result evaluation means for the set of newly synthesized division result for the article space, said column layout order and said article data layout order does not update the maximum evaluation value before that and, starts its operation on condition that the time of continued processing exceeds the predetermined processing time.

21. An article layout device as set forth in claim 11, wherein said column generation means normalizes the column combination numbers appearing for the first time so that the numbers are incremented by one in the same direction according to the appearance order.

22. An article layout device as set forth in claim 11, wherein said layout data group storage means deletes data with the corresponding evaluation value data, when required to store more sets than predetermined, starting from the sets with lower evaluation values given by said layout result evaluation means among the sets of the article space division result, said column layout order and said article data layout order so as to store a new set of data.

* * * * *